(12) United States Patent
Ly et al.

(10) Patent No.: US 11,984,983 B2
(45) Date of Patent: May 14, 2024

(54) CARRIER SELECTION FOR PUCCH REPETITION WITH PUCCH CARRIER SWITCHING

(71) Applicant: QUALCOMM Incorporated, San Diego, CA (US)

(72) Inventors: Hung Dinh Ly, San Diego, CA (US); Yi Huang, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/449,638

(22) Filed: Sep. 30, 2021

(65) Prior Publication Data

US 2023/0100345 A1 Mar. 30, 2023

(51) Int. Cl.
*H04L 1/08* (2006.01)
*H04L 5/00* (2006.01)
*H04W 72/0453* (2023.01)
*H04W 72/231* (2023.01)
*H04W 72/21* (2023.01)

(52) U.S. Cl.
CPC ............... *H04L 1/08* (2013.01); *H04L 5/001* (2013.01); *H04L 5/0053* (2013.01); *H04L 5/0094* (2013.01); *H04W 72/0453* (2013.01); *H04W 72/231* (2023.01); *H04W 72/21* (2023.01)

(58) Field of Classification Search
CPC ......... H04L 1/08; H04L 5/001; H04L 5/0053; H04L 5/0094; H04W 72/0453; H04W 72/23; H04W 72/231; H04W 72/232
See application file for complete search history.

(56) References Cited

U.S. PATENT DOCUMENTS

| 2018/0098266 A1* | 4/2018 | Futaki ................... H04W 72/04 |
| 2020/0029335 A1* | 1/2020 | Yang ................... H04W 52/242 |
| 2021/0076387 A1* | 3/2021 | Papasakellariou .. H04W 52/248 |

(Continued)

OTHER PUBLICATIONS

International Search Report and Written Opinion dated Nov. 25, 2022 from corresponding PCT Application No. PCT/US2022/074996.

(Continued)

*Primary Examiner* — Kevin C. Harper
(74) *Attorney, Agent, or Firm* — QUALCOMM Incorporated

(57) ABSTRACT

Aspects are provided which allow a UE configured with PUCCH repetitions to determine, in response to an indication from a base station to switch carriers for PUCCH transmissions, which CCs of a PUCCH group are configured for PUCCH repetitions, when CCs are configured for PUCCH repetitions, what resources in CCs are configured for PUCCH repetitions, and/or how to count PUCCH repetitions in configured CCs. For instance, the UE may receive a PUCCH configuration from a base station indicating PUCCH repetitions, receive an indication from the base station to switch between CCs in a PUCCH group for PUCCH transmissions, and determine at least one of the following configured by the base station: a subset of the CCs for the PUCCH repetitions, a time pattern of the CCs for the PUCCH repetitions, a resource allocation for each of the PUCCH repetitions, or a count for each of the PUCCH repetitions.

30 Claims, 14 Drawing Sheets

(56) References Cited

U.S. PATENT DOCUMENTS

2022/0295392 A1* 9/2022 Papasakellariou .... H04L 1/1861
2023/0102290 A1* 3/2023 Babaei ................. H04L 5/0098
370/329

OTHER PUBLICATIONS

NEC: "UE feedback enhancements for HARQ-ACK", 3GPP Draft; R1-2107156, 3rd Generation Partnership Pro.Ject (3GPP), Mobile Competence Centre; 650, Route Des Lucioles; F-06921 Sophia-Antipolis Cedex ; France vol. RAN WG1, No. e-Meeting; Aug. 16, 2021-Aug. 27, 2021, Aug. 6, 2021 (Aug. 6, 2021), XP052033461, Retrieved from the Internet: URL:https://ftp.3gpp.org/tsg_ran/WG1_RL1/TSGR1_106-e/Docs/R1-2107156.zip R1-2107156.docx [retrieved on Aug. 6, 2021].

Huawei et al: "UE feedback enhancements for HARQ-ACK", 3GPP Draft; R1-2106490, 3rd Generation Partnership Project (3GPP), Mobile Competence Centre; 650, Route Des Lucioles; F-06921 Sophia-Antipolis Cedex; France vol. RAN WG1, No. E-meeting; Aug. 16, 2021-Aug. 27, 2021, Aug. 7, 2021 (Aug. 7, 2021), XP052037818, Retrieved from the Internet: URL:https://ftp.3gpp.org/tsg_ran/WG1_RL1/TSGR1_106-e/Docs/R1-2106490.zip R1-2106490.docx [retrieved on Aug. 7, 2021].

* cited by examiner

CARRIER SELECTION FOR PUCCH REPETITION WITH PUCCH CARRIER SWITCHING

BACKGROUND

Technical Field

The present disclosure generally relates to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a physical uplink control channel (PUCCH) configuration from a base station indicating a plurality of PUCCH repetitions. The UE also receives an indication from the base station to switch between component carriers (CCs) in a PUCCH group for PUCCH transmissions. The UE determines at least one of: a subset of the CCs for the PUCCH repetitions, a time pattern of the CCs for the PUCCH repetitions, a resource allocation for each of the PUCCH repetitions, or a count for each of the PUCCH repetitions.

In an aspect of the disclosure, a method, a computer-readable medium, and an apparatus are provided. The apparatus may be a base station. The base station transmits a PUCCH configuration to a UE indicating a plurality of PUCCH repetitions. The base station also transmits an indication to the UE to switch between CCs in a PUCCH group for PUCCH transmissions. The base station configures at least one of: a subset of the CCs for the PUCCH repetitions, a time pattern of the CCs for the PUCCH repetitions, or a resource allocation for each of the PUCCH repetitions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
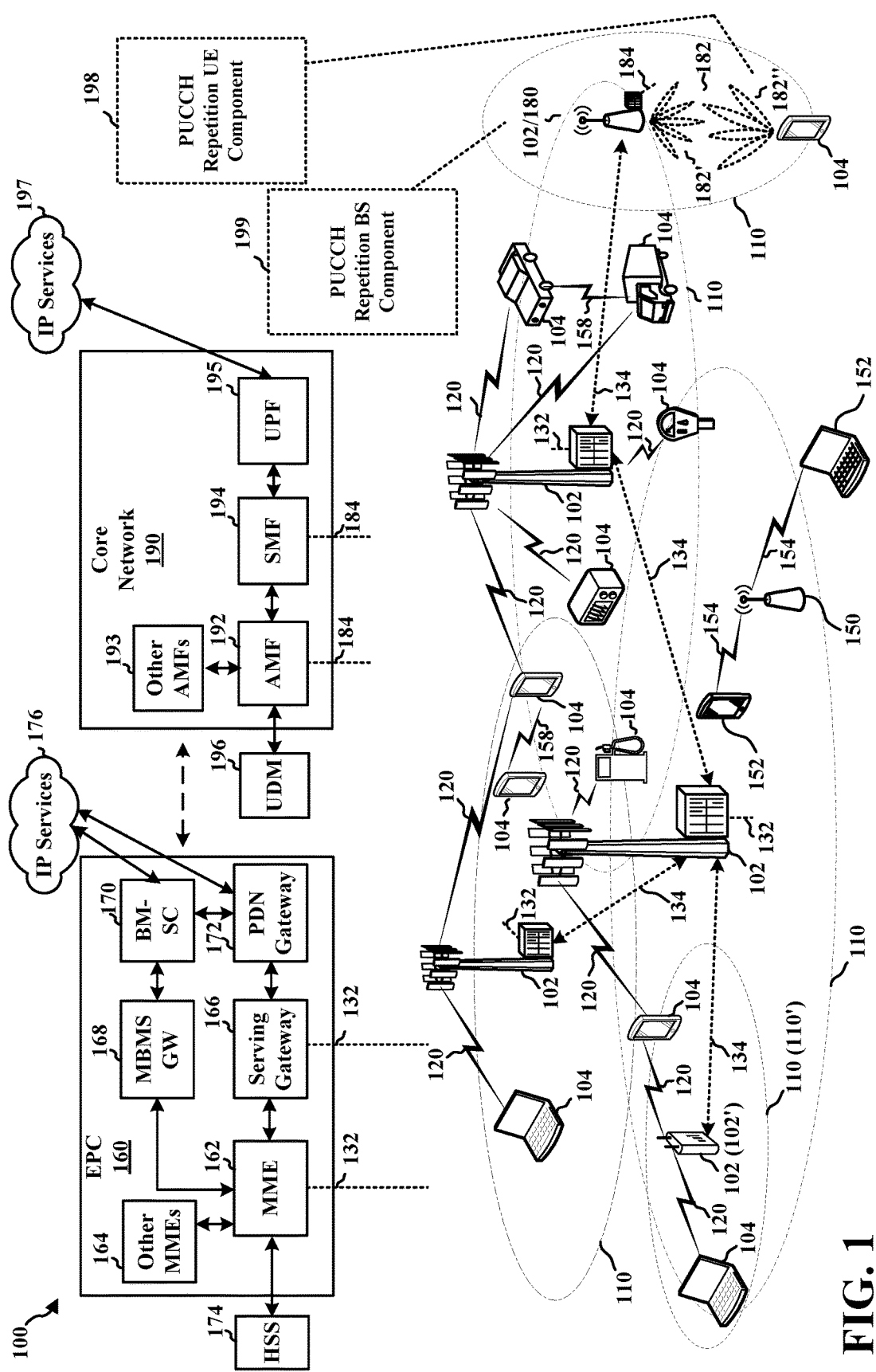
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A UE may transmit uplink control information (UCI) in PUCCH, including HARQ-ACK information (e.g., an acknowledgment/non-acknowledgment (A/N), scheduling requests (SR), and channel state information (CSI). The PUCCH resources available to the UE may be provided in a PUCCH configuration (e.g., pucch-Config or another name), which the base station may transmit to the UE via dedicated RRC signaling. Each PUCCH resource may also be within one or more PUCCH resource sets (e.g., provided by a configuration pucch-ResourceSet or another name) and may include a configuration for a PUCCH format (e.g., provided by pucch-FormatConfig or another name), which the base station may configure for the UE. Moreover, the UE may be configured a number of slots for repetitions of a PUCCH transmission, depending on the PUCCH format associated with the PUCCH transmission. For example, for a PUCCH resource associated with PUCCH formats 1, 3, or 4, the UE may repeat the transmission of A/N in the same symbols within two, four, or eight slots (or other configured number of slots provided by nrofSlots or another name in pucch-FormatConfig). Thus, the base station may indicate or configure a number of repetitions for a PUCCH transmission via RRC (e.g., in the PUCCH format configuration via nrofSlots).

In carrier aggregation (CA), two or more component carriers may be aggregated in order to support wider transmission bandwidths. Each component carrier may be associated with a serving cell, e.g., primary or secondary cells. The primary cell may be served by a primary component carrier (PCC) which the base station may use for signaling control and user data to the UE. The secondary cells may each be served by a secondary component carrier (SCC) which the base station may use for signaling user data in additional radio resources to the UE. Moreover, each of the serving cells may be grouped into a PUCCH group. PUCCH groups may include primary PUCCH groups or secondary PUCCH groups. A primary PUCCH group is a group of serving cells including a primary cell whose PUCCH signaling is associated with the PUCCH on the primary cell. A secondary PUCCH group is a group of secondary cells whose PUCCH signaling is associated with the PUCCH on a PUCCH secondary cell (PSCC). Typically, a UE may only transmit PUCCH data (e.g., UCI) in the PCC in a primary PUCCH group or in the PSCC in a secondary PUCCH group. Thus, typically UCI associated with a SCC in a primary PUCCH group may only be transmitted in the PCC of that PUCCH group, and UCI associated with a SCC in a secondary PUCCH group may only be transmitted in the PSCC of that PUCCH group.

However, in some cases, a base station may allow a UE to switch carriers for PUCCH transmissions. For example, the base station may allow the UE to transmit PUCCH data in a SCC of a PUCCH group, rather than in only the PCC or PSCC of the PUCCH group. To configure the UE to switch carriers for PUCCH transmissions, the base station may dynamically or semi-statically indicate the UE to transmit an A/N (or other UCI) associated with a component carrier of a primary PUCCH group or a secondary PUCCH group. For example, the base station may provide a DCI dynamically indicating the UE to switch to a component carrier for a PUCCH transmission responsive to a dynamically scheduled PDSCH transmission, or the base station may provide an RRC-configured time pattern semi-statically indicating the UE to switch to a component carrier for a PUCCH transmission responsive to a semi-persistently scheduled (SPS) PDSCH transmission. In this way, latency in PUCCH transmissions may be reduced since the UE may be allowed to transmit PUCCH data, for example, in slots associated with SCCs occurring earlier in time than slots associated with PCCs (depending on the configured slot formats of a PUCCH group). This reduction in latency may be particularly beneficial for URLLC services where PUCCH data may be time-sensitive.

Similar to typical PUCCH transmissions, a UE may generally only transmit PUCCH repetitions in the PCC in a primary PUCCH group or in the PSCC in a secondary PUCCH group. However, limiting transmission of PUCCH repetitions to slots in the PCC (or PSCC) may result in an inefficient delay if earlier slots in a SCC are able to support the PUCCH repetition. While a short slot delay between SCCs and PCCs may not be much latency where a small number of PUCCH repetitions is configured (e.g., 2 repetitions), such latency may increase as more repetitions are configured (e.g., 8 or more repetitions). Moreover, the increase in latency may be a significant problem in URLLC services where the PUCCH repetitions may be time-sensitive. Therefore, it would be helpful to allow UEs configured with PUCCH repetitions to transmit the repetitions across multiple CCs of a PUCCH group (including SCCs), for instance, when the base station allows the UE to switch carriers for PUCCH transmissions.

Accordingly, aspects of the present disclosure allow a UE configured with PUCCH repetitions to transmit the repetitions in different CCs of a PUCCH group, including PCCs (or PSCCs) and SCC(s), in response to an indication from the base station to switch carriers for PUCCH transmissions (e.g., a DCI or RRC-configured time pattern). In particular, various aspects of the present disclosure allow the base station to configure and the UE to determine: which CCs of a PUCCH group are configured for PUCCH repetitions, when CCs are configured for PUCCH repetitions, what resources in CCs are configured for PUCCH repetitions, and/or how to count PUCCH repetitions in configured CCs. In one aspect, the base station may configure a subset of CCs in a PUCCH group for transmitting PUCCH repetitions, and after the UE determines the subset from the configuration, the UE may transmit PUCCH repetitions across CCs of the determined subset. In another aspect, the base station may configure a repetition transmission time pattern across the CCs of a PUCCH group for transmitting PUCCH repetitions, and after the UE determines the time pattern from the configuration, the UE may transmit PUCCH repetitions across the CCs according to the determined time pattern. In a further aspect, the base station may configure a resource allocation for each PUCCH repetition in the CCs of a PUCCH group, and after the UE determines the resource allocation from the configuration, the UE may transmit PUCCH repetitions across the CCs according to the determined resource allocation. In an additional aspect, the UE may count a number of configured PUCCH repetitions transmitted across CCs of a PUCCH group. In this way, PUCCH repetitions may be transmitted across multiple CCs of a PUCCH group with minimal latency, for example, without limiting repetitions to PCCs or PSCCs.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a PUCCH repetition UE component 198 that is configured to receive a physical uplink control channel (PUCCH) configuration from a base station indicating a plurality of PUCCH repetitions; receive an indication from the base station to switch between component carriers (CCs) in a PUCCH group for PUCCH transmissions; and determine at least one of: a subset of the CCs for the PUCCH repetitions, a time pattern of the CCs for the PUCCH repetitions, a resource allocation for each of the PUCCH repetitions, or a count for each of the PUCCH repetitions.

Referring again to FIG. 1, in certain aspects, the base station 180 may include a PUCCH repetition BS component 199 that is configured to transmit a PUCCH configuration to a UE indicating a plurality of PUCCH repetitions; transmit an indication to the UE to switch between CCs in a PUCCH group for PUCCH transmissions; and configure at least one of: a subset of the CCs for the PUCCH repetitions, a time pattern of the CCs for the PUCCH repetitions, or a resource allocation for each of the PUCCH repetitions.

Figures 2A, 2B, 2C, 2D:
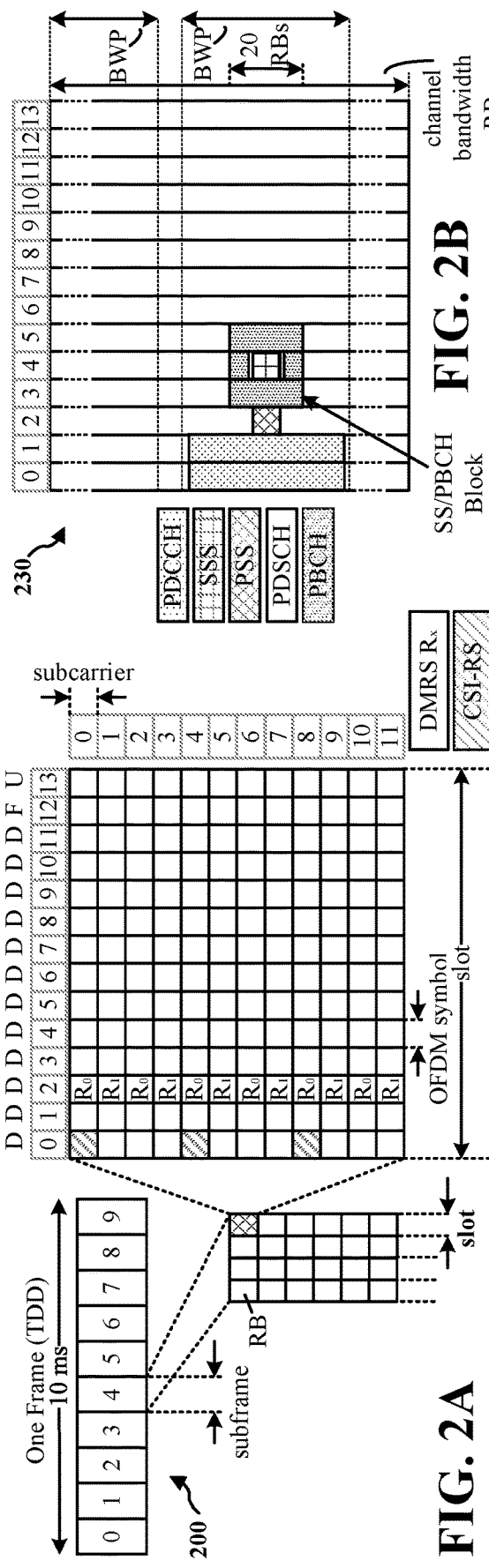
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
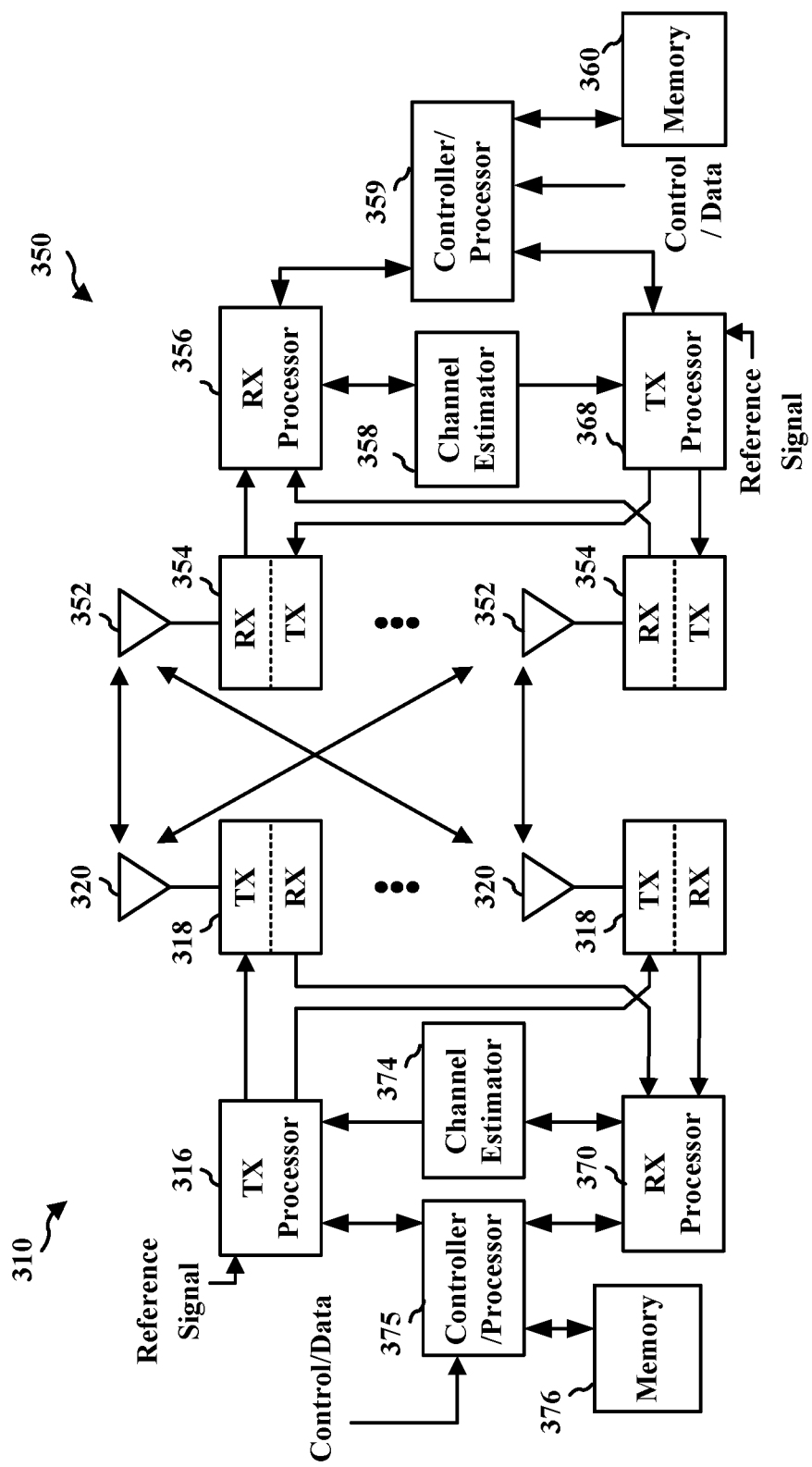
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with PUCCH repetition UE component 198 of FIG. 1.

At least one of the TX processor 316, the RX processor 370, and the controller/processor 375 may be configured to perform aspects in connection with PUCCH repetition BS component 199 of FIG. 1.

A UE may transmit uplink control information (UCI) in PUCCH, including HARQ-ACK information (e.g., an acknowledgment/non-acknowledgment (A/N), scheduling requests (SR), and channel state information (CSI). For example, if a base station provides DCI to the UE scheduling downlink data on PDSCH or activating a semi-persistently scheduled (SPS) PDSCH transmission, the UE may provide A/N to the base station in a configured PUCCH resource acknowledging or not acknowledging receipt of the downlink data on PDSCH. The PUCCH resources available to the UE may be provided in a PUCCH configuration (e.g., pucch-Config or another name), which the base station may transmit to the UE via dedicated RRC signaling. Each PUCCH resource may also be within one or more PUCCH resource sets (e.g., provided by a configuration pucch-ResourceSet or another name) and may include a configuration for a PUCCH format (e.g., provided by pucch-FormatConfig or another name), which the base station may configure for the UE. Each PUCCH format may indicate a number of symbols allocated to a PUCCH transmission, and a number of bits of the information that may be carried in the PUCCH transmission. For example, PUCCH format 0 may include 1-2 symbols and may carry up to two UCI bits, PUCCH format 1 may include between 4-14 symbols and may carry up to two UCI bits, PUCCH format 2 may include 1-2 symbols and may carry more than two UCI bits, and PUCCH formats 3 and 4 may each include 4-14 symbols and may carry more than two UCI bits.

Moreover, the UE may be configured a number of slots for repetitions of a PUCCH transmission, depending on the PUCCH format associated with the PUCCH transmission. For example, for a PUCCH resource associated with PUCCH formats 1, 3, or 4, the UE may repeat the transmission of A/N in the same symbols within two, four, or eight slots (or other configured number of slots provided by nrofSlots or another name in pucch-FormatConfig). Thus, the base station may indicate or configure a number of repetitions for a PUCCH transmission via RRC (e.g., in the PUCCH format configuration via nrofSlots).

Figure 4:
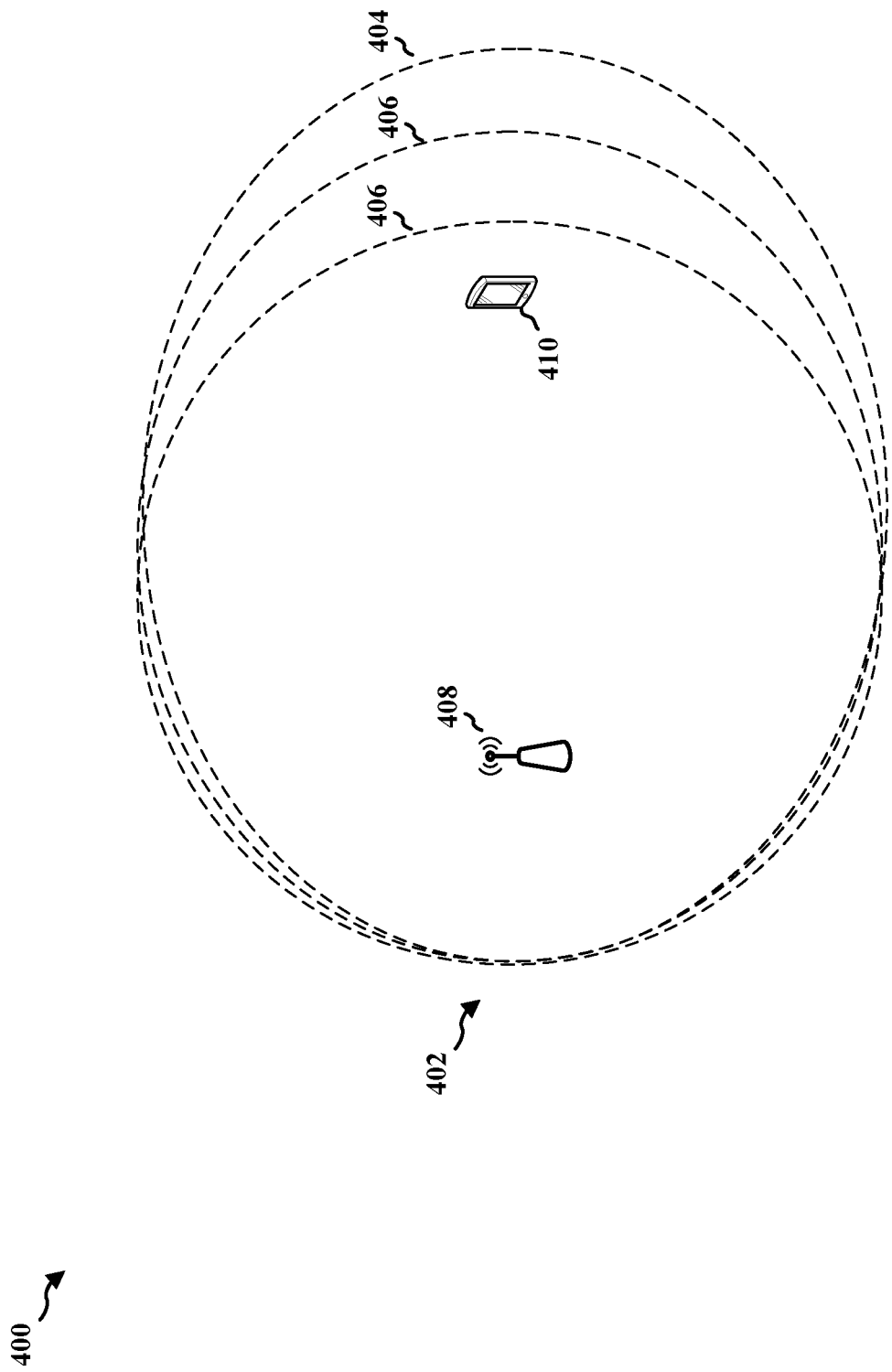
FIG. 4 is a diagram illustrating an example of a serving cell including coverage of a primary cell and coverage of a plurality of secondary cells in which a base station may communicate with a UE.

In carrier aggregation (CA), two or more component carriers may be aggregated in order to support wider transmission bandwidths. Each component carrier may be associated with a serving cell, e.g., primary or secondary cells. FIG. 4 illustrates an example 400 of a serving cell 402 including coverage of a primary cell 404 and coverage of a plurality of secondary cells 406 in which a base station 408 may communicate with a UE 410. The primary cell 404 may be served by a primary component carrier (PCC) which the base station 408 may use for signaling control and user data to the UE 410. The secondary cells 406 may each be served by a secondary component carrier (SCC) which the base station 408 may use for signaling user data in additional radio resources to the UE 410. While the example of FIG. 4 only illustrates two secondary cells, other numbers of SCCs/secondary cells may be configured for communication between the base station 408 and the UE 410.

Figure 5:
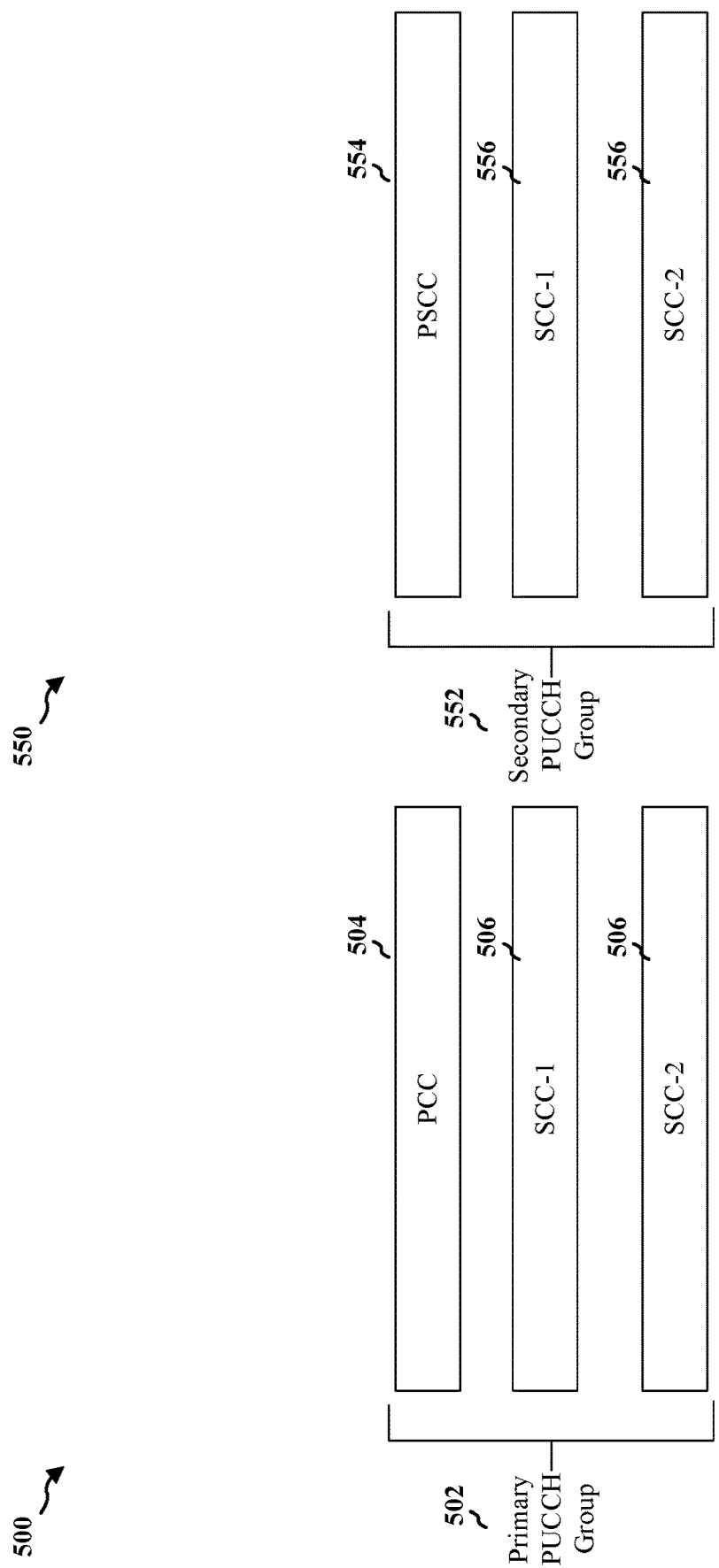
FIGS. 5A and 5B are diagrams illustrating examples of a primary PUCCH group and a secondary PUCCH group, respectively.

Each of the serving cells (e.g., primary cell 404 and secondary cells 406) may be grouped into a PUCCH group. PUCCH groups may include primary PUCCH groups or secondary PUCCH groups. A primary PUCCH group is a group of serving cells including a primary cell whose PUCCH signaling is associated with the PUCCH on the primary cell. A secondary PUCCH group is a group of secondary cells whose PUCCH signaling is associated with the PUCCH on a PUCCH secondary cell (PSCC). FIG. 5A illustrates an example 500 of a primary PUCCH group 502, which may include a PCC 504 and multiple SCCs 506. FIG. 5B illustrates an example 550 of a secondary PUCCH group 552, which may include a PSCC 554 and multiple SCCs 556. While FIGS. 5A and 5B illustrate examples where each PUCCH group includes two SCCs, in other examples other numbers of SCCs can be configured in each PUCCH group. Typically, a UE may only transmit PUCCH data (e.g., UCI) in the PCC in a primary PUCCH group or in the PSCC in a secondary PUCCH group. Thus, typically UCI associated with a SCC in a primary PUCCH group may only be transmitted in the PCC of that PUCCH group, and UCI associated with a SCC in a secondary PUCCH group may only be transmitted in the PSCC of that PUCCH group.

However, in some cases, a base station may allow a UE to switch carriers for PUCCH transmissions. For example, the base station may allow the UE to transmit PUCCH data in a SCC of a PUCCH group, rather than in only the PCC or PSCC of the PUCCH group. To configure the UE to switch carriers for PUCCH transmissions, the base station may dynamically or semi-statically indicate the UE to transmit an A/N (or other UCI) associated with a component carrier of a primary PUCCH group or a secondary PUCCH group. For example, the base station may provide a DCI dynamically indicating the UE to switch to a component carrier for a PUCCH transmission responsive to a dynamically scheduled PDSCH transmission, or the base station may provide an RRC-configured time pattern semi-statically indicating the UE to switch to a component carrier for a PUCCH transmission responsive to a semi-persistently scheduled (SPS) PDSCH transmission. In this way, latency in PUCCH transmissions may be reduced since the UE may be allowed to transmit PUCCH data, for example, in slots associated with SCCs occurring earlier in time than slots associated with PCCs (depending on the configured slot formats of a PUCCH group). This reduction in latency may be particularly beneficial for URLLC services where PUCCH data may be time-sensitive.

Figure 6:
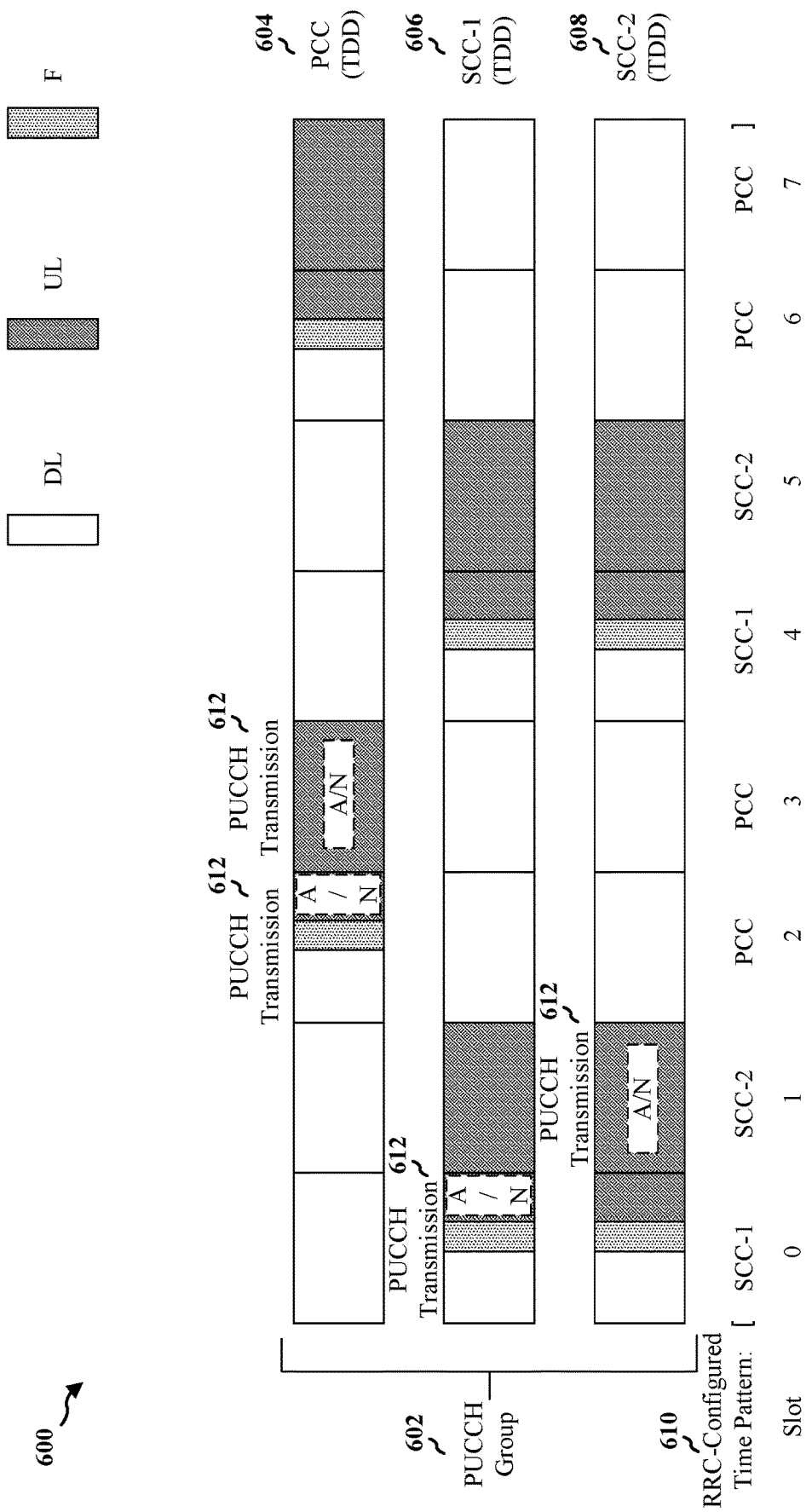
FIG. 6 is a diagram illustrating an example of a PUCCH group in which the UE may switch between component carriers for PUCCH transmissions.

FIG. 6 illustrates an example 600 of a PUCCH group 602, including a PCC 604, a first SCC 606, and a second SCC 608, in which the UE may switch between component carriers for PUCCH transmissions. In this example, each of the CCs are configured to operate under a time division duplex (TDD) scheme with a respective slot format of downlink (DL) slots, uplink (UL) slots, and special slots, where the SCC slot formats are different than the PCC slot format. Special slots are slots including downlink symbols, uplink symbols, and flexible (F) symbols (symbols which may be configured as either DL or UL). Alternatively, in other examples one or more of the CCs may be configured with the same TDD slot format, may be configured with a different slot format than illustrated, or may operate under a frequency division duplex (FDD) scheme. Moreover, while FIG. 6 illustrates an example where PUCCH group 602 includes a PCC and only two SCCs, in other examples the PCC may be replaced with a PSCC and/or the number of SCCs may be different.

In the illustrated example, the base station may provide an RCC-configured time pattern 610 indicating an order of CCs in which the UE may transmit PUCCH data in corresponding slots. The RRC-configured time pattern may follow the configured UL and special slots in each CC in the PUCCH group. In response to the RRC-configured time pattern, the UE may determine a CC in which to provide a PUCCH transmission 612 in response to a prior, SPS PDSCH transmission. For example, if the base station configures the following illustrated time pattern for PUCCH group 602 such as illustrated in FIG. 6: SCC-1, SCC-2, PCC, PCC (repeating), the UE may provide A/N in either the first SCC 606 during special slots 0 or 4, the second SCC 608 during UL slots 1 or 5, or the PCC 604 during special slots 2 or 6 or UL slots 3 or 7. Alternatively, in other examples, the base station may configure a different time pattern for PUCCH group 602 (e.g., corresponding to a different configuration of UL slots in each CC in the PUCCH group), and the UE may determine different CCs or slots in which to transmit PUCCH data accordingly.

In another example, the base station may provide a dynamic indication indicating a CC (e.g., a carrier index) in which the UE may transmit PUCCH data in a corresponding slot. For instance, referring to the example of FIG. 6, rather than configuring and providing RRC-configured time pattern 610 to the UE, the base station may transmit a DCI in one of the CCs of PUCCH group 602 (e.g., the PCC 604 or either of the SCCs 606) indicating a same or different CC for the PUCCH transmission 612 (e.g., via a field in DCI). The DCI may also indicate the allocated time-frequency resources for a dynamic PDSCH transmission scheduled by the DCI and the allocated time-frequency resources for the PUCCH transmission 612 responsive to the PDSCH transmission. As an example, if the UE receives DCI in slot 0 of the PCC 604 which schedules a PDSCH transmission in slot 2 of the first SCC 606 and PUCCH transmission 612 in slot 4 of the second SCC 608, the UE may transmit A/N in slot 4 of the second SCC 606 in response to the indication in DCI.

Similar to PUCCH transmissions, typically, a UE may only transmit PUCCH repetitions in the PCC in a primary PUCCH group or in the PSCC in a secondary PUCCH group. Moreover, the UE may only transmit a single PUCCH repetition in a given slot. Thus, if a base station configures a UE to transmit PUCCH repetitions, the base station may indicate a starting UL slot in which the UE may transmit the first PUCCH repetition in PCC or PSCC, and the UE may transmit subsequent PUCCH repetitions in subsequent UL (or special) slots in PCC or PSCC having a sufficient number of symbols to support the PUCCH repetitions.

Figure 7:
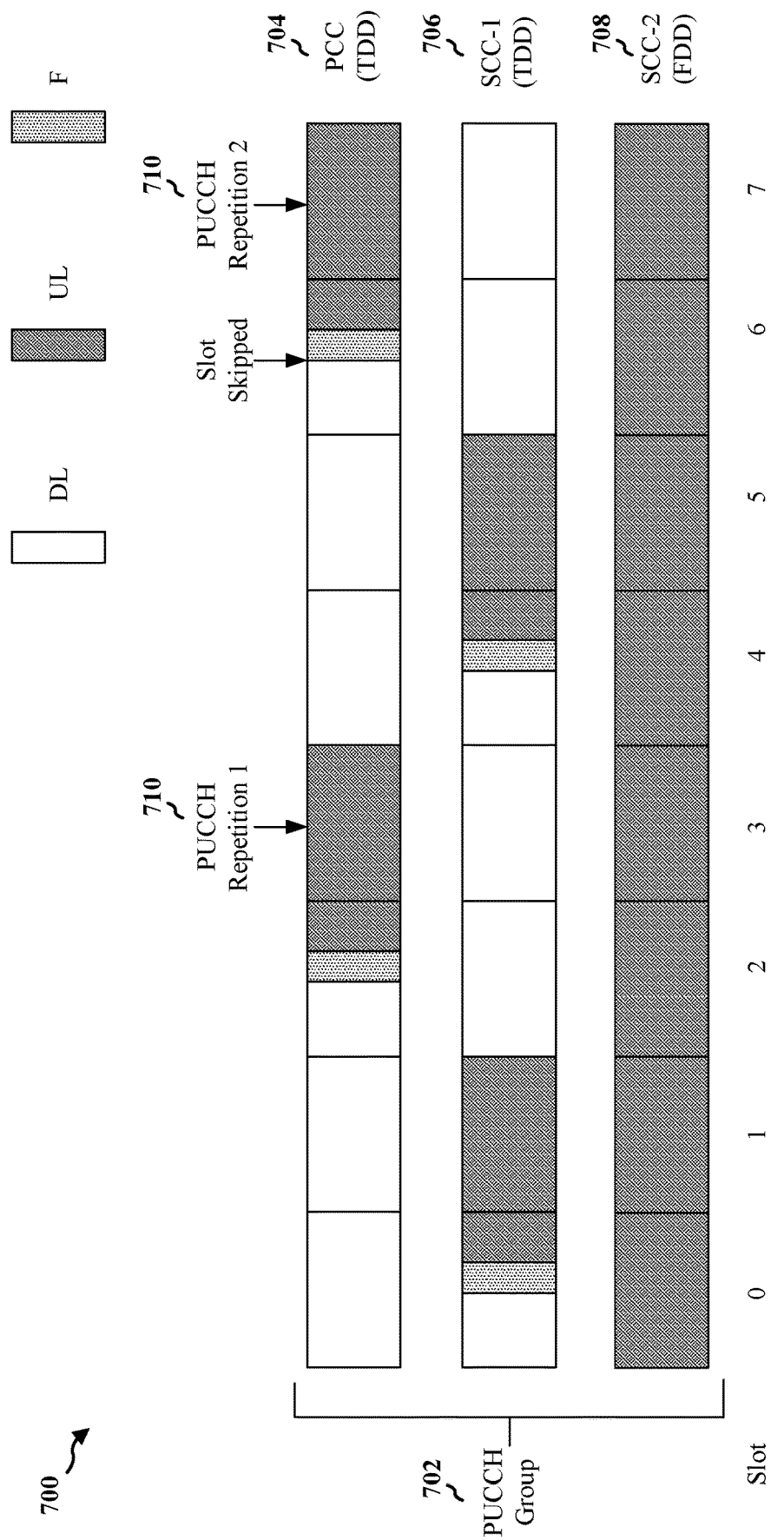
FIG. 7 is a diagram illustrating an example of a PUCCH group in which the UE may transmit PUCCH repetitions in only a single component carrier.

FIG. 7 illustrates an example 700 of a PUCCH group 702, including a PCC 704, a first SCC 706, and a second SCC 708, in which the UE may transmit PUCCH repetitions 710 in only PCC 704. In this example, the PCC 704 and first SCC 706 are configured to operate under a TDD scheme with different slot formats of DL, UL, and special slots, while the second SCC 708 is configured to operate under a FDD scheme with UL slots. Alternatively, one or more of the CCs may be configured with different slot formats or duplexing schemes than illustrated in FIG. 7. Moreover, while FIG. 7 illustrates an example where PUCCH group 702 includes a PCC and only two SCCs, in other examples the PCC may be replaced with a PSCC and/or the number of SCCs may be different.

The time-frequency resources configured for each PUCCH repetition (e.g., the RBs, starting slot, and transmission duration) are the same in each of the slots in PCC 704 containing the PUCCH repetitions. For example, if a first PUCCH repetition is configured to start at an initial symbol 0 and span 14 symbols of an UL slot in the PCC, then a second PUCCH repetition would also start at an initial symbol 0 and span 14 symbols of a subsequent UL slot in the PCC. Similarly, if a first PUCCH repetition is configured to start at an initial UL symbol 10 and span 4 UL symbols of a special slot in the PCC, then a second PUCCH repetition would also start at an initial UL symbol 0 and span 4 UL symbols of a subsequent special slot in the PCC. However, if a subsequent special slot is not able to support the time-frequency resources for the PUCCH repetition (e.g., the position and number of UL symbols or flexible symbols in the special slot do not accommodate the starting symbol and transmission duration of the PUCCH repetition), then the PUCCH repetition may be delayed to a later UL slot in the PCC. For instance, in the example of FIG. 7, if PUCCH repetition 1 is configured to start at initial symbol 0 and span 14 symbols of UL slot 3 in PCC 704, then the UE may not transmit PUCCH repetition 2 until the next UL slot 7 notwithstanding the existence of intermediate, special slot 6, since slot 6 would not be able to accommodate the same time-frequency resources for PUCCH repetition 2 (e.g., the UL symbols or the flexible symbols of that intermediate slot may not be able to start at symbol 0 or span 14 symbols in length). Thus, the UE may skip transmitting PUCCH repetition 2 in special slot 6 and wait until UL slot 7 to transmit the PUCCH repetition, as illustrated in FIG. 7. On the other hand, if PUCCH repetition 1 was configured to start, for example, at initial symbol 10 and span 4 symbols of UL slot 3 in PCC 704, then the UE may be able to transmit PUCCH repetition 2 in special slot 6 if the UL symbols or flexible symbols of slot 6 accommodated that PUCCH repetition (e.g., starting at symbol 10 or spanning 4 symbols in length), rather than waiting until UL slot 7. As a result, limiting transmission of PUCCH repetitions to UL slots of the PCC may result in PUCCH repetitions delays if intermediate special slots are available to accommodate the PUCCH repetition.

Nevertheless, even if special slots as well as UL slots in the PCC could accommodate a PUCCH repetition, limiting transmission of the PUCCH repetition to the PCC may still result in an inefficient delay if an earlier UL or special slot in a SCC is able to support the PUCCH repetition. For instance, in the example of FIG. 7, even if the UE was able to transmit PUCCH repetition 2 in special slot 6 as described above (rather than UL slot 7), the PUCCH repetition would still be delayed in the PCC with respect to the SCCs, since earlier UL slots 4 or 5 in the first and second SCCs 706, 708 may also be able to accommodate the PUCCH repetition. While this short slot delay between SCCs and PCCs may not be much latency where a small number of PUCCH repetitions is configured (e.g., a maximum latency of 2 slots in the example of FIG. 7 for two PUCCH repetitions), such latency may increase as more repetitions are configured (e.g., a maximum latency of 16 slots in the example of FIG. 7 for eight PUCCH repetitions). Such increase in latency may be a significant problem in URLLC services where the PUCCH repetitions may be time-sensitive. Therefore, it would be helpful to allow UEs configured with PUCCH repetitions to transmit the repetitions across multiple CCs of a PUCCH group (including SCCs), for instance, when the base station allows the UE to switch carriers for PUCCH transmissions.

Accordingly, aspects of the present disclosure allow a UE configured with PUCCH repetitions to transmit the repetitions in different CCs of a PUCCH group, including PCCs (or PSCCs) and SCC(s), in response to an indication from the base station to switch carriers for PUCCH transmissions (e.g., a DCI or RRC-configured time pattern such as described above with respect to FIG. 6). In particular, various aspects of the present disclosure allow the base station to configure and the UE to determine: which CCs of a PUCCH group are configured for PUCCH repetitions, when CCs are configured for PUCCH repetitions, what resources in CCs are configured for PUCCH repetitions, and/or how to count PUCCH repetitions in configured CCs. In one aspect, the base station may configure a subset of CCs in a PUCCH group for transmitting PUCCH repetitions, and after the UE determines the subset, the UE may transmit PUCCH repetitions across CCs of the determined subset. In another aspect, the base station may configure a repetition transmission time pattern across the CCs of a PUCCH group for transmitting PUCCH repetitions, and after the UE determines the time pattern, the UE may transmit PUCCH repetitions across the CCs according to the determined time pattern. In a further aspect, the base station may configure a resource allocation for each PUCCH repetition in the CCs of a PUCCH group, and after the UE determines the resource allocation, the UE may transmit PUCCH repetitions across the CCs according to the determined resource allocation. In an additional aspect, the UE may count a number of PUCCH repetitions transmitted across CCs of a PUCCH group. In this way, PUCCH repetitions may be transmitted across multiple CCs of a PUCCH group with minimal latency, for example, without limiting repetitions to PCCs or PSCCs.

In one aspect where the base station configures the UE to switch carriers for PUCCH transmissions, the base station may also configure the UE to transmit PUCCH repetitions in a subset of CCs in a PUCCH group. In one example, the base station may provide a RRC configuration indicating the subset of CCs in a PUCCH group in which the UE may transmit PUCCH repetitions. For example, this RRC configuration may be the PUCCH configuration which indicates the PUCCH resources in which the UE may transmit PUCCH repetitions, the PUCCH format configuration which indicates the number of PUCCH repetitions, or some other configuration which the UE receives from the base station. The base station may indicate up to N CCs for the subset in the RRC configuration. That is, the subset may have a maximum subset size N. In response to determining the configured subset of CCs in the a PUCCH group, the UE may transmit PUCCH repetitions in UL or special slots of only those CCs (rather than all CCs in the PUCCH group).

In another example, rather than receiving from the base station an RRC configuration indicating the subset of CCs in a PUCCH group, the UE may instead determine the subset of CCs based on one or more configured rules, in response to which rules the UE may identify up to N CCs for the subset. For example, the UE may determine which CCs of a PUCCH group to include in a subset having a maximum subset size N according to an order of each CC index, and/or a duplexing scheme associated with each CC. For instance, in addition to selecting the PCC for the subset, the UE may select SCCs in ascending or descending order of CC index until N−1 SCCs are selected for the subset, and/or the UE may select SCCs associated with FDD configurations before SCCs associated with TDD configurations until N−1 SCCs are selected for the subset (since FDD bands typically include more PUCCH resources than TDD bands). Similarly, in the alternative example where the base station provides an RRC configuration indicating the subset of CCs in a PUCCH group, the base station may apply one or more of the aforementioned rules to select the CCs to include in the subset. Similarly, in response to determining the subset of CCs in the a PUCCH group, the UE may transmit PUCCH repetitions in UL or special slots of only those CCs, rather than all CCs in the PUCCH group.

In either of the aforementioned examples, this maximum subset size N may be a fixed (e.g., pre-configured) number, or the base station may indicate a value of N to the UE (e.g., in an RRC configuration). The value of N may also be based on a capability of the UE. For example, if the UE indicates to the base station in a capability information message that the UE is capable of carrier aggregating X CCs, where X is a given number of CCs indicated by the UE for carrier aggregation, the base station may select or indicate a value N for the maximum subset size such that N<X. Alternatively, N may be a function of X.

Moreover, in some examples, if the base station does not indicate the subset of CCs in an RRC configuration, the UE may determine the subset of CCs based on one or more configured rules such as described above. For instance, the UE determination may be a fallback or default behavior of the UE in response to failing to receive the base station indication. Alternatively, the UE determination may be independent of such base station indication (e.g., the UE may determine subsets of CCs based on configured rules notwithstanding receipt of an RRC message indicating a subset of CCs).

Figure 8:
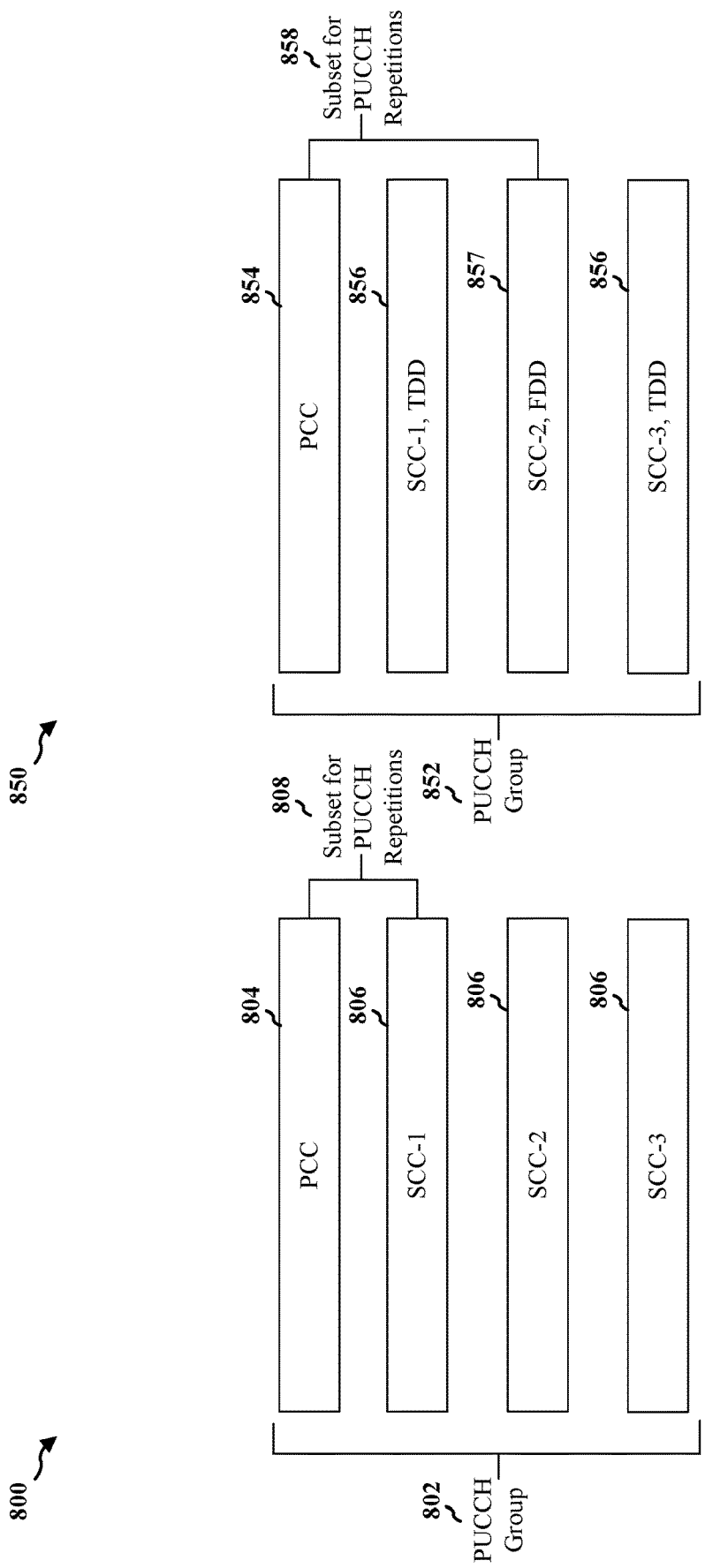
FIGS. 8A and 8B are diagrams illustrating examples of PUCCH groups including subsets of CCs which are indicated by the base station or determined by the UE for PUCCH repetitions.

FIG. 8A illustrates an example 800 of a PUCCH group 802, including a PCC 804 and SCCs 806, where a subset 808 of these CCs are indicated by the base station or determined by the UE for PUCCH repetitions. FIG. 8B illustrates another example 850 of a PUCCH group 852, including a PCC 854 and SCCs 856, 857 where a subset 858 of these CCs are similarly indicated by the base station or determined by the UE for PUCCH repetitions. In the example of FIG. 8A, the PCC 804 and SCCs 806 are each configured to operate under a TDD scheme. In the example of FIG. 8B, the PCC 854 and SCCs 856 are each configured to operate under a TDD scheme, while the SCC 857 is configured to operate under a FDD scheme. Moreover, in each example, the PCC 804, 854 may be associated with a first carrier index (e.g., CC index 0), SCC-1 may be associated with a second carrier index (e.g., CC index 1), SCC-2 may be associated with a third carrier index (e.g., CC index 2), and SCC-3 may be associated with a fourth carrier index (e.g., CC index 3). In other examples, one or more of the CCs may be configured with different carrier indices or duplexing schemes than illustrated in FIGS. 8A and 8B. Moreover, while FIGS. 8A and 8B illustrate examples where PUCCH groups 802, 852 each include a PCC and only three SCCs, in other examples the PCC may be replaced with a PSCC and/or the number of SCCs may be different. Moreover, while the examples of FIGS. 8A and 8B illustrate only two CCs (one PCC and one SCC) in each subset, in other examples, a different number or combination of CCs may be included in each subset.

In one example, the base station may indicate the CCs in the subset 808, 858 to the UE (e.g., in an RRC configuration). For instance, in the example of FIG. 8A, the base station may include PCC 804 and SCC-1 in the subset 808, and in the example of FIG. 8B, the base station may include PCC 854 and SCC-2 in the subset 858. The base station may indicate other combinations of CCs in subset 808, 858 in other examples (e.g., combinations of PCC and other SCCs, or combinations of only SCCs). In another example, the UE may determine the CCs in the subset 808, 858 based on one or more configured rules. The UE may select SCCs for the subset in ascending or descending order of CC index, or the UE may select SCCs for the subset which are associated with FDD configurations before SCCs which are associated with TDD configurations. For instance, in the example of FIG. 8A, where the maximum size of subset 808 is 2 (N=2), the UE may determine that SCC-1 is associated with the lowest CC index 1, and therefore the UE may select for subset 808 the SCC-1 as well as the PCC to transmit PUCCH repetitions in PUCCH group 802. Similarly, in the example of FIG. 8B, where the maximum size of subset 858 is 2 (N=2), the UE may determine that SCC-2 is associated with an FDD configuration, and therefore the UE may select for subset 858 the SCC-2 as well as the PCC to transmit PUCCH repetitions in PUCCH group 852. The UE may similarly determine subsets based on CC duplexing schemes in addition to CC indices (e.g., the lowest CC indies for an FDD or TDD CC)

In another aspect where the base station configures the UE to switch carriers for PUCCH transmissions, the base station may configure a repetition transmission time pattern across the CCs of a PUCCH group for transmitting PUCCH repetitions. In one example, the base station may configure PUCCH repetitions to follow an RRC-configured time pattern for PUCCH carrier switching. For instance, the base station may provide a configuration similar to that described above with respect to FIG. 6 (e.g., RRC-configured time pattern 610), which indicates the CCs of a PUCCH group in which the UE may transmit PUCCH data in corresponding slots. In response to this configured time pattern, the UE may determine the CCs and corresponding slots in which to provide PUCCH repetitions and transmit repeated PUCCH data in the determined CCs and slots accordingly. In another example, the base station may configure and indicate a different time pattern than the RRC-configured time pattern for PUCCH carrier switching (e.g., RRC-configured time pattern 610) for PUCCH repetitions across CCs of a PUCCH group. For example, the different time pattern may be a subset of the RRC-configured time pattern 610 and may allow for more scheduling flexibility than that which may be provided by the RRC-configured time pattern 610. In response to determining the configured repetition transmission time pattern indicating an order of CCs and corresponding slots for PUCCH repetitions, the UE may transmit PUCCH repetitions in UL or special slots of those CCs of the PUCCH group accordingly.

Figure 9:
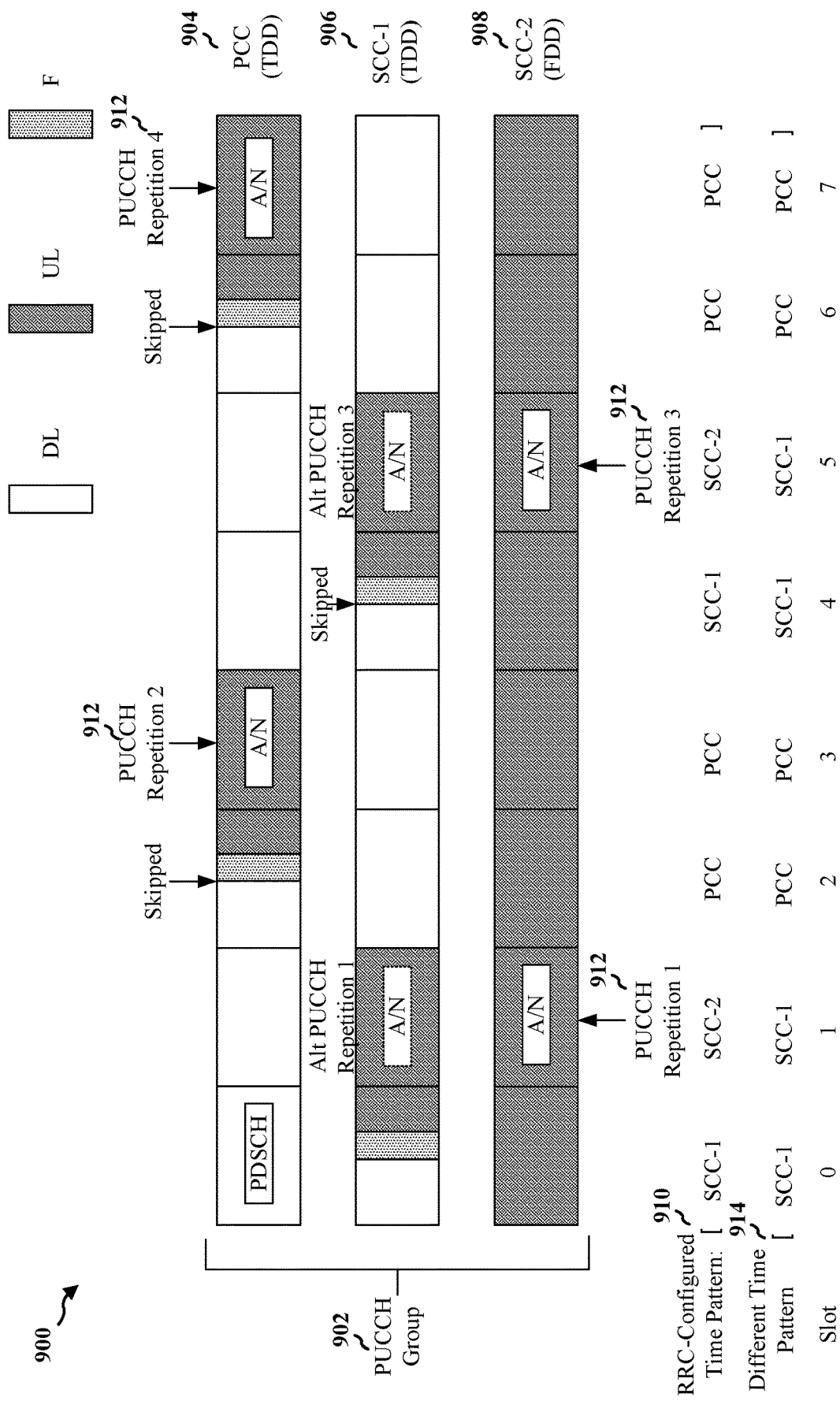
FIG. 9 is a diagram illustrating an example of a PUCCH group in which the UE may transmit PUCCH repetitions across multiple CCs of the PUCCH group.

FIG. 9 illustrates an example 900 of a PUCCH group 902, including a PCC 904, a first SCC 906, and a second SCC 908, in which the UE may transmit PUCCH repetitions across multiple CCs of the PUCCH group. In this example, the PCC 904 and first SCC 906 are configured to operate under a TDD scheme with different slot formats of DL, UL, and special slots, while the second SCC 908 is configured to operate under a FDD scheme with UL slots. Alternatively, one or more of the CCs may be configured with different slot formats or duplexing schemes than illustrated in FIG. 9. Moreover, while FIG. 9 illustrates an example where PUCCH group 902 includes a PCC and only two SCCs, in other examples the PCC may be replaced with a PSCC and/or the number of SCCs may be different.

In the illustrated example, the base station may provide an RRC-configured time pattern 910 indicating an order of CCs in which the UE may transmit PUCCH repetitions 912 in corresponding slots. The RRC-configured time pattern 910 may be correspond to RRC-configured time pattern 610 described above with respect to FIG. 6. For instance, the RRC-configured time pattern may follow the configured UL slots in each CC in the PUCCH group. In response to the RRC-configured time pattern, the UE may determine the CCs in which to provide PUCCH repetitions 912 in response to a prior, SPS PDSCH transmission. For example, in response to receiving RRC-configured time pattern 910 from the base station, the UE may determine the following time pattern for PUCCH group 902 such as illustrated in FIG. 9: SCC-1, SCC-2, PCC, PCC (repeating). In such case, the UE may provide PUCCH repetitions (e.g., repeated A/N) in the first SCC 906 during special slots 0 or 4, the second SCC 908 during UL slots 1 or 5, or the PCC 904 during special slots 2 or 6 or UL slots 3 or 7. Alternatively, in other examples, the base station may configure a different time pattern for PUCCH group 902 (e.g., corresponding to a different configuration of UL slots in each CC in the PUCCH group), and the UE may determine different CCs or slots in which to transmit PUCCH repetitions accordingly.

Similar to the PUCCH repetitions described above with respect to FIG. 7, in this example, the time-frequency resources configured for each PUCCH repetition may be the same in each of the slots containing the PUCCH repetitions. For example, if a first PUCCH repetition is configured to start at an initial symbol 0 and span 14 symbols of an UL slot in the PCC, then a second PUCCH repetition would also start at an initial symbol 0 and span 14 symbols of a subsequent UL slot in the PCC. Similarly, if a first PUCCH repetition is configured to start at an initial UL symbol 10 and span 4 UL symbols of a special slot in the PCC, then a second PUCCH repetition would also start at an initial UL symbol 0 and span 4 UL symbols of a subsequent special slot in the PCC. Thus, if the UE is configured to transmit four PUCCH repetitions according to RRC-configured time pattern 910, then assuming that special slots are able to support the time-frequency resources for the PUCCH repetitions, the UE may provide PUCCH repetition 1 in the first SCC 906 during special slot 0, PUCCH repetition 2 in the second SCC 908 during UL slot 1, PUCCH repetition 3 in the PCC 904 during special slot 2, and PUCCH repetition 4 in the PCC 904 during UL slot 3. However, if special slots are not able to support the time-frequency resources for the PUCCH repetition (e.g., the position and number of UL symbols or flexible symbols in the special slot do not accommodate the starting symbol and transmission duration of the PUCCH repetition), then the UE may skip those special slots for PUCCH repetitions and delay the PUCCH repetitions until the next corresponding UL slot in the next corresponding CC determined from the time pattern. For instance, as illustrated in the example of FIG. 9 with RRC-configured time pattern 910, if the UE receives a PDSCH in slot 0 triggering PUCCH repetition 1 to start at initial symbol 0 and span 14 symbols of UL slot 1 in second SCC 908, then the UE may transmit PUCCH repetition 2 in UL slot 3 of PCC 904 (skipping special slot 2 in PCC 904), followed by PUCCH repetition 3 in UL slot 5 of second SCC 908 (skipping special slot 4 in first SCC 906), and then by PUCCH repetition 4 in UL slot 7 of PCC 904 (skipping special slot 6 in PCC 904). Thus, the UE may be limited to supported slots for PUCCH repetitions even when transmitting repetitions across multiple CCs of a PUCCH group following the RRC-configured time pattern for PUCCH carrier switching.

In other examples, the UE may transmit PUCCH repetitions 912 in supported slots of indicated CCs according to a different time pattern 914 than the RRC-configured time pattern 910. For instance, different time pattern 914 may be a subset of RRC-configured time pattern 910 (or some other pattern) indicating a different number or order of CCs in which the UE may transmit PUCCH data in corresponding slots. For example, if RRC-configured time pattern 910 includes a set of three CCs ([PCC, SCC-1, SCC-2]) such as illustrated in FIG. 9, then a subset of RRC-configured time pattern (e.g., the different time pattern 914 in the illustrated example) may include a set of two CCs (e.g., [PCC, SCC-1]). In response to the different time pattern 914, the UE may similarly determine CCs in which to provide PUCCH repetitions 912 in response to a prior, SPS PDSCH transmission. For example, in response to receiving different time pattern 914 from the base station, the UE may determine the following time pattern for PUCCH group 902 such as illustrated in FIG. 9: SCC-1, SCC-1, PCC, PCC (repeating). In such case, the UE may provide PUCCH repetitions (e.g., repeated A/N) in the first SCC 906 during special slots 0 or 4 or UL slots 1 or 5, or the PCC 904 during special slots 2 or 6 or UL slots 3 or 7. Alternatively, in other examples, the base station may configure another different time pattern for PUCCH group 902, and the UE may determine different CCs or slots in which to transmit PUCCH repetitions accordingly.

The configuration of the different time pattern 914 may provide more scheduling flexibility for the base station in comparison to the RRC-configured time pattern 910. For example, as illustrated in the example of FIG. 9, if the UE follows RRC-configured time pattern 910, the UE may transmit PUCCH repetitions 1 and 3 in UL slots 1 and 5 of SCC-2. However, in this example where the UE follows different time pattern 914, the UE may instead transmit alternate PUCCH repetitions 1 and 3 in UL slots 1 and 5 of SCC-1, such as illustrated in FIG. 9. In this way, the UE may leave the corresponding slots of SCC-2 available for the base station to schedule for other purposes than receiving PUCCH repetitions, thus providing more scheduling flexibility.

In a further aspect where the base station configures the UE to switch carriers for PUCCH transmissions, the base station may configure a resource allocation for each PUCCH repetition in the CCs of a PUCCH group. In one example, the base station may configure resource allocations for PUCCH repetitions individually for each CC. For instance, referring to the example 900 of FIG. 9, the base station may configure a start symbol and transmission duration of each PUCCH repetition 912 in a slot independently for PCC 904, first SCC 906, and second SCC 908. Each of the configured resource allocations (e.g., the start symbol and transmission duration) may be the same for each CC or different for each CC. For example, the base station may configure PUCCH repetitions to start at the same symbol and span the same length of symbols of a slot in each of the PCC 904, first SCC 906 and second SCC 908, or alternatively, the base station may configure PUCCH repetitions in the PCC 904 to start at a symbol and span a length of symbols of a slot, PUCCH repetitions in the first SCC 906 to start at another symbol and span another length of symbols of a slot, and PUCCH repetitions in the second SCC 908 to start at a further symbol and span a further length of symbols of a slot. Thus, independent resource allocations for PUCCH repetitions may be configured for each CC, and after the UE determines the resource allocations, the UE may transmit PUCCH repetitions in configured CCs and slots according to the configured resource allocations. For example, the UE may transmit PUCCH repetitions in the configured resources within UL or special slots unless such slots are unable to support the allocated resources, in which case the UE may skip such slots and transmit PUCCH repetitions in configured resources of the next slot such as described above with respect to FIG. 9.

In another example, the base station may configure a resource allocation for PUCCH repetitions only in one CC (e.g., the PCC or an SCC), and the UE may apply that resource allocation for other configured CCs for PUCCH repetitions. For example, if the base station configures a resource allocation for PUCCH repetitions in the PCC, and the UE determines to transmit PUCCH repetitions in a subset of CCs (e.g., subset 808, 858 of FIGS. 8A/8B), the UE may apply the PCC configured resource allocation to the SCC(s) in the determined subset. Thus, each of the resource allocations (e.g., the start symbol and transmission duration) may be the same for each configured CC. For example, referring to FIGS. 8A/8B and 9, the base station may configure PUCCH repetitions in the PCC 804, 854, 904 of subset 808, 858 to start at a symbol and span a length of symbols of a slot, and the UE may determine that PUCCH repetitions in the first SCC 806, 906 or second SCC 857, 908 of subset 808, 858 may start at the same symbol and span the same length of symbols of a slot. In response to determining the resource allocations, the UE may transmit PUCCH repetitions in configured CCs according to the determined resource allocations. For example, the UE may transmit PUCCH repetitions in the determined resources within UL or special slots unless such slots are unable to support the allocated resources, in which case the UE may skip such slots and transmit PUCCH repetitions in determined resources of the next slot such as described above with respect to FIG. 9.

In an additional aspect, the UE may count a number of PUCCH repetitions transmitted across CCs of a PUCCH group. In one example, the base station may configure a number of PUCCH repetitions which the UE may transmit in configured or determined CCs of a PUCCH group, and the UE may count each PUCCH repetition until the configured number of PUCCH repetitions have been sent. For example, if the base station configures the UE to transmit four PUCCH repetitions (e.g., in the PUCCH format configuration, PUCCH configuration, or other RRC message), and if the UE determines to transmit these PUCCH repetitions in a subset of CCs (e.g., subset 808, 858 of FIGS. 8A/8B), the UE may track each PUCCH repetition that is sent in the CCs in the subset until the configured number of PUCCH repetitions have all been accounted for. For instance, referring to FIGS. 8A/8B and 9, the UE may count a first one of the PUCCH repetitions 912 in slot 1 of first SCC 806, 906 or second SCC 857, 908 of subset 808, 858, a second one of the PUCCH repetitions 912 in slot 3 of PCC 804, 854, 904 of subset 808, 858, a third one of the PUCCH repetitions 912 in slot 5 of first SCC 806, 906 or second SCC 857, 908 of subset 808, 858, and a fourth one of the PUCCH repetitions 912 in slot 7 of PCC 804, 854, 904 of subset 808, 858, after which the UE may determine that all four PUCCH repetitions have been provided to the base station and thus the UE may stop transmitting PUCCH repetitions.

In another example, the UE may perform PUCCH repetition counting based on a resource allocation configuration in the configured CCs of a PUCCH group for PUCCH repetitions. For instance, if the base station configures resource allocations for PUCCH repetitions individually for each CC as described above, the UE may count each PUCCH repetition until the configured number of PUCCH repetitions have been sent in the individually configured resource allocations. For example, if the base station configures the UE to transmit four PUCCH repetitions (e.g., in the PUCCH format configuration, PUCCH configuration, or other RRC message), and if the UE determines to transmit these PUCCH repetitions in individually configured resource allocations (e.g., starting at a same or different symbol of a slot and spanning a same or different length of symbols in the slot), the UE may track each PUCCH repetition that is sent in the allocated resources of the CCs until the configured number of PUCCH repetitions have all been accounted for. For instance, referring to FIG. 9, the UE may count a first one of the PUCCH repetitions 912 in symbol 0 and spanning 14 symbols of slot 1 of first SCC 906 or second SCC 908, a second one of the PUCCH repetitions 912 in symbol 0 and spanning 14 symbols of slot 3 of PCC 904, a third one of the PUCCH repetitions 912 in symbol 0 and spanning 14 symbols of slot 5 of first SCC 906 or second SCC 908, and a fourth one of the PUCCH repetitions 912 in symbol 0 and spanning 14 symbols of slot 7 of PCC 904, after which the UE may determine that all four PUCCH repetitions have been provided to the base station and thus the UE may stop transmitting PUCCH repetitions.

Figure 10:
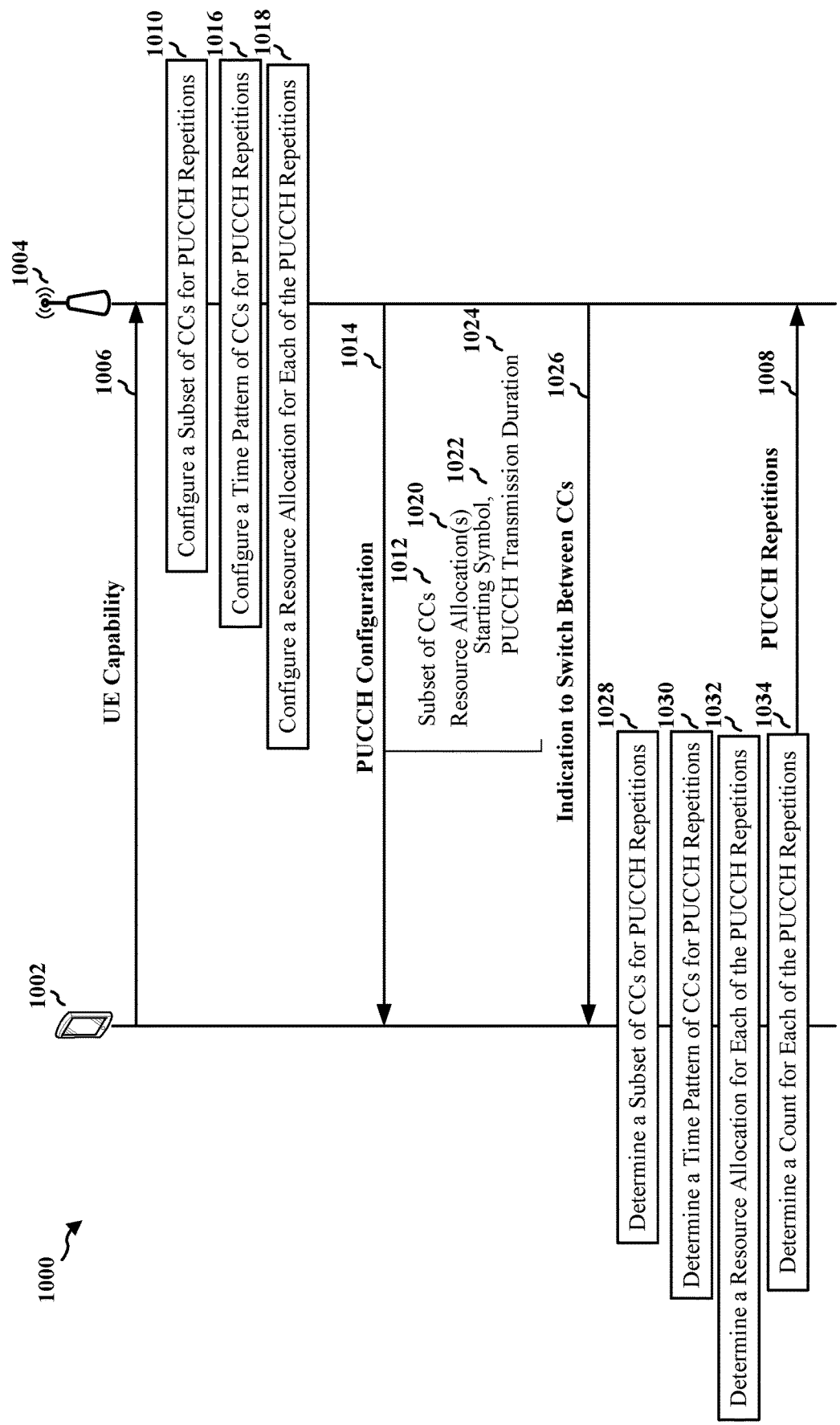
FIG. 10 is a call flow diagram between a UE and a base station.

FIG. 10 is an example 1000 of a call flow between a UE 1002 and a base station 1004. Initially, the UE may transmit a capability information message to the base station indicating a UE capability 1006, and the base station may determine a maximum subset size N of CCs for PUCCH repetitions 1008 in response to the UE capability. For example, the UE may indicate to the base station that the UE is capable of carrier aggregating X CCs (e.g., a PCC and X−1 SCCs), where X is a given number of CCs indicated by the UE for carrier aggregation, and the base station may select or indicate a value N for the maximum subset size such that N<X. Alternatively, N may be a function of X.

At block 1010, the base station 1004 may configure a subset of CCs 1012 (e.g., subset 808, 858) in a PUCCH group for transmitting PUCCH repetitions 1008. In one example, the base station may provide an RRC configuration indicating the subset of CCs 1012 in PUCCH group 802, 852, 902 in which the UE may transmit PUCCH repetitions 912. For example, the RRC configuration may be a PUCCH configuration 1014 or some other RRC configuration. In another example, the base station may apply one or more configured rules to select the CCs 804, 806, 854, 856, 857, 904, 906, 908 to include in the subset 808, 858, 1012 in the RRC configuration. For instance, the base station may select which CCs 804, 806, 854, 856, 857, 904, 906, 908 of PUCCH group 802, 852, 902 to include in subset 808, 858, 1012 according to an order of each CC index, and/or a duplexing scheme associated with each CC.

At block 1016, the base station 1004 may configure a repetition transmission time pattern (e.g., RRC-configured time pattern 910 or different time pattern 914) across the CCs of a PUCCH group for transmitting PUCCH repetitions 1008. For example, the repetition transmission time pattern may be configured in PUCCH configuration 1014 or some other RRC configuration. In one example, the base station may configure PUCCH repetitions 912 to follow RRC-configured time pattern 610, 910 for PUCCH carrier switching, such as described above with respect to FIG. 9. In another example, the base station may configure and indicate different time pattern 914 than RRC-configured time pattern 610, 910 for PUCCH repetitions 912 across CCs 904, 906, 908 of PUCCH group 902 (or across CCs in subset 808, 858).

At block 1018, the base station 1004 may configure a resource allocation 1020 (e.g., a start symbol 1022 and transmission duration 1024) for each PUCCH repetition 1008 in the CCs of a PUCCH group. The resource allocation(s) 1020 may be configured in PUCCH configuration 1014 or some other RRC configuration. In one example, the base station may configure resource allocations for PUCCH repetitions 1008 individually for each CC 804, 806, 854, 856, 857, 904, 906, 908 of PUCCH group 802, 852, 902 (or for each CC in subset 808, 858). In another example, the base station may configure a resource allocation for PUCCH repetitions 1008 in only one of the CCs 804, 806, 854, 856, 857, 904, 906, 908, and that resource allocation may be applied to other ones of the CCs in PUCCH group 802, 852, 902 (or in subset 808, 858) for PUCCH repetitions.

The base station 1004 may provide PUCCH configuration 1014 to UE 1002 indicating the PUCCH resources in which the UE may transmit PUCCH repetitions 1008. Moreover, the PUCCH configuration 1014 may indicate the subset of CCs 1012 configured at block 1010, the repetition transmission time pattern (e.g., RRC-configured time pattern 910 or different time pattern 914) configured at block 1016, and the resource allocation(s) 1020 including start symbol(s) 1022 and transmission duration(s) 1024 for PUCCH repetitions 1008. Alternatively, the base station may indicate these parameters in a different RRC configuration than PUCCH configuration 1014, or a combination of these parameters in multiple RRC configurations including PUCCH configuration 1014.

The base station 1004 may provide an indication 1026 for the UE 1002 to switch CCs of a PUCCH group for PUCCH transmissions. For example, if the base station provides RRC-configured time pattern 610 to the UE semi-statically indicating the UE to switch to a CC (e.g., PCC 604 or SCCs 606, 608) for PUCCH transmission 612 responsive to a SPS PDSCH transmission, such as described above with respect to FIG. 6, the indication 1026 may be the RRC-configured time pattern. In another example, the indication 1026 may be a DCI dynamically indicating the UE to switch to a CC (e.g., PCC 604 or SCCs 606, 608) for PUCCH transmission 612 responsive to a dynamically scheduled PDSCH transmission, such as also described above with respect to FIG. 6.

Afterwards, in response to receiving indication 1026, the UE 1002 may determine to switch CCs of a PUCCH group for PUCCH repetitions (e.g., based on the determinations made at blocks 1028, 1030, 1032, and/or 1034 described below). For instance, the UE may determine which CCs of a PUCCH group are configured for PUCCH repetitions (e.g., at block 1010), when CCs are configured for PUCCH repetitions (e.g., at block 1016), what resources in CCs are configured for PUCCH repetitions (e.g., at block 1018), and/or how to count PUCCH repetitions in configured CCs.

At block 1028, the UE 1002 may determine the subset of CCs 1012 (e.g., subset 808, 858) in the PUCCH group for transmitting PUCCH repetitions 1008. In one example, the UE may determine the subset of CCs from an RRC configuration provided by the base station 1004. In such case, the RRC configuration may indicate the subset of CCs 1012 in PUCCH group 802, 852, 902 in which the UE may transmit PUCCH repetitions 912. For example, the RRC configuration may be a PUCCH configuration 1014 or some other RRC configuration. In another example, the UE may determine the subset of CCs 1012 based on one or more configured rules, in response to which rule(s) the UE may identify the CCs 804, 806, 854, 856, 857, 904, 906, 908 for the subset 808, 858, 1012. For instance, the UE may determine which CCs 804, 806, 854, 856, 857, 904, 906, 908 of PUCCH group 802, 852, 902 are included in subset 808, 858, 1012 according to an order of each CC index, and/or a duplexing scheme associated with each CC. In other examples, if the base station does not indicate the subset of CCs in an RRC configuration, the UE may determine the subset of CCs based on the aforementioned rule(s) as a fallback or default behavior of the UE. Alternatively, the UE determination may be independent of such base station indication. After the UE determines the subset of CCs, the UE may transmit PUCCH repetitions 1008 across CCs of the determined subset.

At block 1030, the UE 1002 may determine the repetition transmission time pattern (e.g., RRC-configured time pattern 910 or different time pattern 914) for transmitting PUCCH repetitions 1008 across the CCs of the PUCCH group. For example, the repetition transmission time pattern may be indicated in and thus determined from PUCCH configuration 1014 or some other RRC configuration. After the UE determines the time pattern, the UE may transmit PUCCH repetitions 1008 across the CCs according to the determined time pattern. In one example, if the base station 1004 configures PUCCH repetitions 912 to follow RRC-configured time pattern 610, 910 for PUCCH carrier switching, such as described above with respect to FIG. 9, then the UE may determine the CCs 904, 906, 908 and corresponding slots in which to provide PUCCH repetitions based on the RRC-configured time pattern and proceed to transmit repeated PUCCH data in the determined CCs and slots accordingly. In another example, if the base station configures and indicates different time pattern 914 than RRC-configured time pattern 610, 910 for PUCCH repetitions 912 across CCs 904, 906, 908 of PUCCH group 902 (or across CCs in subset 808, 858), then the UE may determine the order of CCs and corresponding slots for PUCCH repetitions indicated in the configured repetition transmission time pattern and proceed to transmit PUCCH repetitions in UL or special slots of those CCs of the PUCCH group accordingly.

At block 1032, the UE 1002 may determine the resource allocation 1020 (e.g., the start symbol 1022 and transmission duration 1024) for each PUCCH repetition 1008 in the CCs of the PUCCH group. The resource allocation(s) 1020 may be configured in and determined from PUCCH configuration 1014 or some other RRC configuration. In one example, the UE may determine from the PUCCH configuration the resource allocations for PUCCH repetitions 1008 individually for each CC 804, 806, 854, 856, 857, 904, 906, 908 of PUCCH group 802, 852, 902 (or for each CC in subset 808, 858). In another example, the UE may determine from the PUCCH configuration the resource allocation for PUCCH repetitions 1008 in only one of the CCs 804, 806, 854, 856, 857, 904, 906, 908, and the UE may determine to apply that resource allocation to other ones of the CCs in PUCCH group 802, 852, 902 (or in subset 808, 858) for PUCCH repetitions. After the UE determines the resource allocation(s) 1020, the UE may transmit PUCCH repetitions 1008 across the CCs according to the determined resource allocation(s).

At block 1034, the UE 1002 may count a number of the PUCCH repetitions 1008 transmitted across CCs of the PUCCH group. For instance, in one example, if the base station configures a number of PUCCH repetitions which the UE may transmit in configured or determined CCs 804, 806, 854, 856, 857, 904, 906, 908 of PUCCH group 802, 852, 902, then the UE may count each PUCCH repetition 1008 until the configured number of PUCCH repetitions have been sent. In another example, the UE may perform PUCCH repetition counting based on a resource allocation configuration in the configured CCs of the PUCCH group for PUCCH repetitions. For instance, if the base station configures resource allocations 1020 for PUCCH repetitions 1008 individually for each CC as described above, the UE may count each PUCCH repetition 1008 until the configured number of PUCCH repetitions have been sent in the individually configured resource allocations. After counting the number of sent PUCCH repetitions, the UE may stop transmitting additional PUCCH repetitions in the configured CCs.

Figure 11:
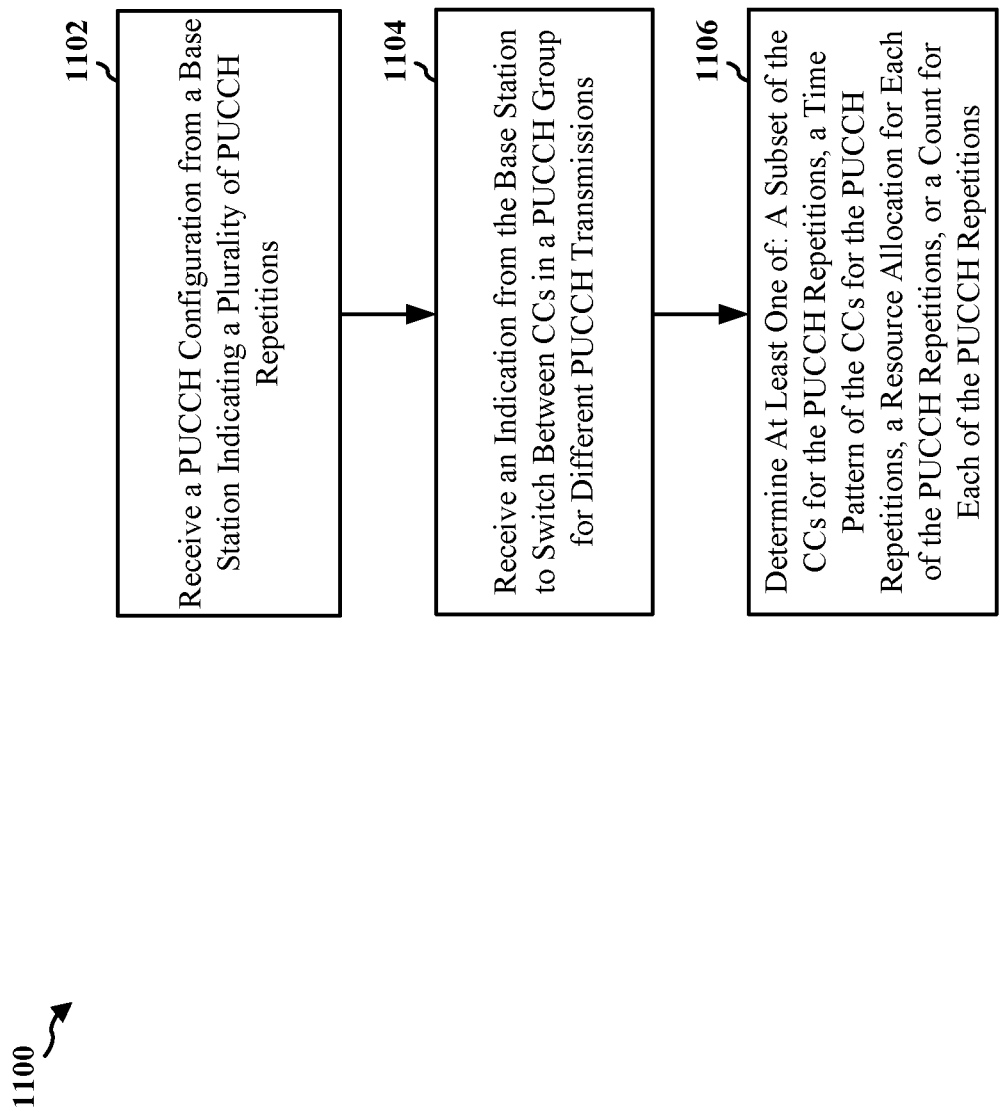
FIG. 11 is a flowchart of a method of wireless communication at a UE.

FIG. 11 is a flowchart 1100 of a method of wireless communication. The method may be performed by a UE (e.g., the UE 104, 350, 1002; the apparatus 1302). The method allows a UE configured with PUCCH repetitions to determine, in response to an indication from the base station to switch carriers for PUCCH transmissions, which CCs of a PUCCH group are configured for PUCCH repetitions, when CCs are configured for PUCCH repetitions, what resources in CCs are configured for PUCCH repetitions, and/or how to count PUCCH repetitions in configured CCs. In this way, the UE may transmit PUCCH repetitions across multiple CCs of a PUCCH group, including PCCs (or PSCCs) and SCC(s), with minimal latency (e.g., without limiting repetitions to PCCs or PSCCs).

At 1102, the UE receives a PUCCH configuration from a base station indicating a plurality of PUCCH repetitions. For example, 1102 may be performed by PUCCH configuration component 1340. For instance, referring to FIG. 10, the UE 1002 may receive, from base station 1004, PUCCH configuration 1014 indicating a plurality of PUCCH repetitions 1008. For example, the PUCCH configuration may indicate PUCCH resources as well as a PUCCH format configuration (or other RRC configuration included in or associated with PUCCH configuration 1014) which indicates a number of slots for PUCCH repetitions 1008 (e.g., via a parameter nrofSlots or some other name). The number of slots (e.g., two, four, eight, or some other number) may indicate the UE to transmit a corresponding number of PUCCH repetitions (e.g., two, four eight, or some other corresponding number) in the configured PUCCH resources.

At 1104, the UE receives an indication from the base station to switch between CCs in a PUCCH group for PUCCH transmissions. For example, 1104 may be performed by indication component 1342. For instance, referring to FIG. 10, the UE 1002 may receive, from base station 1004, indication 1026 for the UE to switch CCs of a PUCCH group for PUCCH transmissions. For example, referring to FIG. 6, the base station may provide RRC-configured time pattern 610 to the UE semi-statically indicating the UE to switch to different ones of the CCs of PUCCH group 602 (e.g., PCC 604, SCC 606, or SCC 608) for different ones of the PUCCH transmissions 612 in response to SPS PDSCH transmission(s). In another example, referring to FIG. 6, the base station may provide a DCI dynamically indicating the UE to switch to one of the CCs of PUCCH group 602 (e.g., PCC 604, SCC 606, or SCC 608) for one of the PUCCH transmissions 612 in response to a dynamically scheduled PDSCH transmission Finally, at 1106, the UE determines at least one of a subset of the CCs for the PUCCH repetitions, a time pattern of the CCs for the PUCCH repetitions, a resource allocation for each of the PUCCH repetitions, or a count for each of the PUCCH repetitions. For example, 1106 may be performed by determination component 1344. For instance, referring to FIG. 10, in response to receiving indication 1026 from base station 1004, the UE 1002 may determine to switch CCs of a PUCCH group for PUCCH repetitions (e.g., based on the determinations made at blocks 1028, 1030, 1032, and/or 1034 described below). For example, the UE may determine which CCs of a PUCCH group are configured for PUCCH repetitions (e.g., at block 1028), when CCs of a PUCCH group are configured for PUCCH repetitions (e.g., at block 1030), what resources in CCs are configured for PUCCH repetitions (e.g., at block 1032), and/or how to count PUCCH repetitions in configured CCs (e.g., at block 1034). In one example, as described with respect to block 1028, the UE 1002 may determine the subset of CCs 1012 (e.g., subset 808, 858 of FIGS. 8A/8B) in PUCCH group 802, 852 for transmitting PUCCH repetitions 1008. In another example, as described with respect to block 1030, the UE 1002 may determine the repetition transmission time pattern (e.g., RRC-configured time pattern 910 or different time pattern 914 of FIG. 9) of CCs 904, 906, 908 for transmitting PUCCH repetitions 1008 in PUCCH group 902. In a further example, as described with respect to block 1032, the UE 1002 may determine the resource allocation 1020 (e.g., the start symbol 1022 and transmission duration 1024) for each PUCCH repetition 1008 in the CCs 904, 906, 908 of the PUCCH group 902. In an additional example, as described with respect to block 1034, the UE 1002 may count a number of the PUCCH repetitions 1008 transmitted across CCs 904, 906, 908 of the PUCCH group 902.

In one example, the subset may be indicated in a configuration from the base station. For instance, referring to FIG. 8-10, the base station may provide an RRC configuration (e.g., the PUCCH configuration 1014 or some other RRC configuration) indicating subset of CCs 1012 (e.g., subset 808, 858) in PUCCH group 802, 852, 902 for PUCCH repetitions, such as described above with respect to FIGS. 8A and 8B. In such case, the UE may determine the subset of CCs 1012 (e.g., subset 808, 858) in which the UE may transmit PUCCH repetitions 912 from the RRC configuration provided by the base station 1004.

In one example, the subset may be determined based on at least one of a CC index or a CC duplexing scheme. For instance, referring to FIGS. 8-10, the UE 1002 may determine the subset of CCs 1012 (e.g., subset 808, 858) based on one or more configured rules, in response to which rule(s) the UE may identify the CCs 804, 806, 854, 856, 857, 904, 906, 908 for the subset 808, 858, 1012. For example, the UE may determine which CCs 804, 806, 854, 856, 857, 904, 906, 908 of PUCCH group 802, 852, 902 are included in subset 808, 858, 1012 according to an order of each CC index, and/or a duplexing scheme (e.g., FDD or TDD) associated with each CC. For instance, as described above with respect to FIGS. 8A/8B, in addition to selecting the PCC for a subset, the UE may select SCCs in ascending or descending order of CC index until N−1 SCCs are selected for the subset, and/or the UE may select SCCs associated with FDD configurations before SCCs associated with TDD configurations until N−1 SCCs are selected for the subset (since FDD bands typically include more PUCCH resources than TDD bands).

In one example, a maximum size of the subset may be fixed, indicated from the base station, or based on UE capability. For instance, referring to FIGS. 8-10, the subset of CCs 1012 (e.g., subset 808, 858) may have a maximum subset size N. This maximum subset size N may be a fixed (e.g., pre-configured) number, or the base station 1004 may indicate a value of N to the UE 1002 (e.g., in an RRC configuration such as PUCCH configuration 1014). The value of N may also be based on UE capability 1006. For example, if the UE indicates to the base station in UE capability 1006 that the UE is capable of carrier aggregating X CCs, where X is a given number of CCs indicated by the UE for carrier aggregation, the base station may select or indicate a value N for the maximum subset size such that N<X. Alternatively, N may be a function of X.

In one example, the indication may comprise a RRC-configured time pattern for switching between the CCs, and the time pattern of the CCs for the PUCCH repetitions may be the same as the RRC-configured time pattern. For instance, referring to FIGS. 6, 9, and 10, the base station 1004 may provide (as indication 1026) RRC-configured time pattern 610, 910 to the UE (e.g., in PUCCH configuration 1014 or some other RRC configuration), such as described above with respect to FIG. 6. Moreover, the PUCCH repetitions 912 may be configured to follow RRC-configured time pattern 610, 910 for PUCCH carrier switching, such as described above with respect to FIG. 9. In such case, the UE may determine the CCs 904, 906, 908 and corresponding slots in which to provide PUCCH repetitions based on the RRC-configured time pattern.

In one example, the indication may comprise a RRC-configured time pattern for switching between the CCs, and the time pattern of the CCs for the PUCCH repetitions may be different than the RRC-configured time pattern. For instance, referring to FIGS. 6, 9, and 10, the base station 1004 may provide (as indication 1026) the RRC-configured time pattern 610, 910 to the UE (e.g., in PUCCH configuration 1014 or some other RRC configuration), such as described above with respect to FIG. 6. Moreover, base station 1004 may further configure and indicate different time pattern 914 than RRC-configured time pattern 610, 910 for PUCCH repetitions 912 across CCs 904, 906, 908 of PUCCH group 902 (or across CCs in subset 808, 858). In such case, the UE 1002 may determine the order of CCs and corresponding slots for PUCCH repetitions indicated in the different time pattern 914, such as described above with respect to FIG. 9.

In one example, each of the resource allocations may be configured for an individual one of the CCs. For instance, referring to FIGS. 8-10, the UE 1002 may determine from the PUCCH configuration 1014 the resource allocations 1020 for PUCCH repetitions 1008 individually for each CC 804, 806, 854, 856, 857, 904, 906, 908 of PUCCH group 802, 852, 902 (or for each CC in subset 808, 858). In one example, the resource allocations may include different PUCCH starting symbols and different PUCCH transmission durations. For instance, referring to FIG. 10, each of the resource allocations 1020 may include different starting symbols 1022 and different PUCCH transmission durations 1024, such as described above with respect to FIG. 9.

In one example, one of the resource allocations may be configured for only one of the CCs and may be applied to other ones of the resource allocations for other ones of the CCs. For instance, referring to FIG. 10, the UE 1002 may determine from the PUCCH configuration 1014 the resource allocation 1020 for PUCCH repetitions 1008 in only one of the CCs 804, 806, 854, 856, 857, 904, 906, 908, and the UE may determine to apply that resource allocation 1020 to other ones of the CCs in PUCCH group 802, 852, 902 (or in subset 808, 858) for the PUCCH repetitions.

In one example, the count for each of the PUCCH repetitions may be based on a corresponding one of the resource allocations for a corresponding one of the CCs. For instance, referring to FIGS. 8-10, if the base station configures resource allocations 1020 for PUCCH repetitions 1008 for each CC of a PUCCH group (e.g., 804, 806, 854, 856, 857, 904, 906, 908), the UE may count each PUCCH repetition 1008 transmitted in each resource allocation. The UE may continue to count PUCCH repetitions until a configured number of PUCCH repetitions (e.g., configured in PUCCH configuration 1014) have been sent in the individually configured resource allocations (across CCs).

Figure 12:
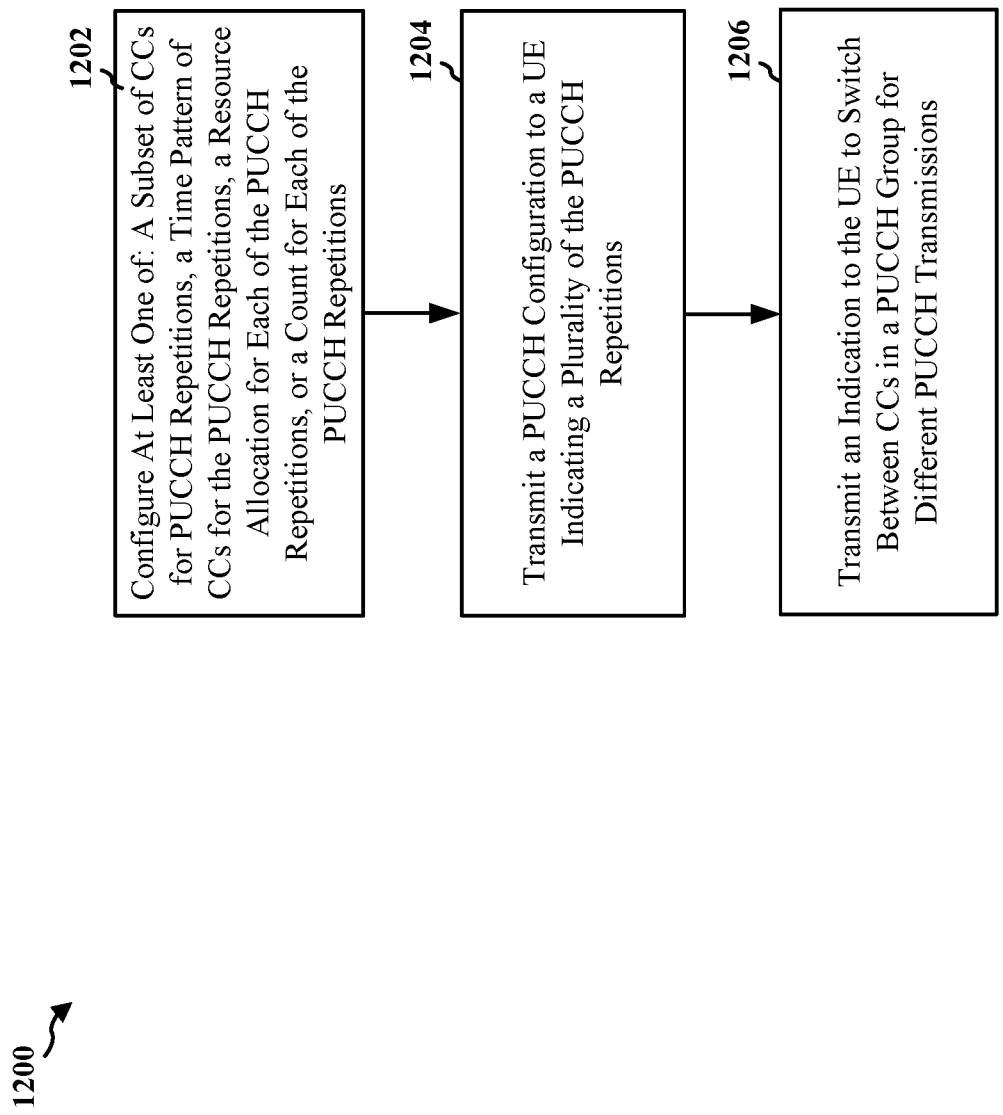
FIG. 12 is a flowchart of a method of wireless communication at a base station.

FIG. 12 is a flowchart 1200 of a method of wireless communication. The method may be performed by a base station (e.g., the base station 102/180, 310, 1004; the apparatus 1402). The method allows a base station, which configures a UE with PUCCH repetitions and which provides the UE an indication to switch carriers for PUCCH transmissions, to further configure the UE with which CCs of a PUCCH group are configured for PUCCH repetitions, when CCs are configured for PUCCH repetitions, and what resources in CCs are configured for PUCCH repetitions, and/or how to count PUCCH repetitions in configured CCs. In this way, the base station may receive PUCCH repetitions across multiple CCs of a PUCCH group, including PCCs (or PSCCs) and SCC(s), with minimal latency (e.g., without limiting repetitions to PCCs or PSCCs).

At 1202, the base station configures at least one of a subset of CCs for PUCCH repetitions, a time pattern of the CCs for the PUCCH repetitions, or a resource allocation for each of the PUCCH repetitions. For example, 1202 may be performed by configuration component 1440. For instance, referring to FIG. 10, the base station 1004 may configure the UE 1002 to switch CCs of a PUCCH group for PUCCH repetitions (e.g., based on the configurations made at blocks 1010, 1016, and/or 1018 described below). In one example, as described with respect to block 1010, the base station 1004 may configure the subset of CCs 1012 (e.g., subset 808, 858 of FIGS. 8A/8B) in PUCCH group 802, 852 for receiving PUCCH repetitions 1008. In another example, as described with respect to block 1016, the base station may configure the repetition transmission time pattern (e.g., RRC-configured time pattern 910 or different time pattern 914 of FIG. 9) of CCs 904, 906, 908 for receiving PUCCH repetitions 1008 in PUCCH group 902. In a further example, as described with respect to block 1018, the base station may configure the resource allocation 1020 (e.g., the start symbol 1022 and transmission duration 1024) for each PUCCH repetition 1008 in the CCs 904, 906, 908 of the PUCCH group 902.

At 1204, the base station transmits a PUCCH configuration to a UE indicating a plurality of PUCCH repetitions. For example, 1204 may be performed by PUCCH configuration component 1442. For instance, referring to FIG. 10, the base station 1004 may transmit, to UE 1002, PUCCH configuration 1014 indicating a plurality of PUCCH repetitions 1008. For example, the PUCCH configuration may indicate PUCCH resources as well as a PUCCH format configuration (or other RRC configuration included in or associated with PUCCH configuration 1014) which indicates a number of slots for PUCCH repetitions 1008 (e.g., via a parameter nrofSlots or some other name). The number of slots (e.g., two, four, eight, or some other number) may indicate the UE to transmit a corresponding number of PUCCH repetitions (e.g., two, four eight, or some other corresponding number) in the configured PUCCH resources.

At 1206, the base station transmits an indication to the UE to switch between CCs in a PUCCH group for PUCCH transmissions. For example, 1206 may be performed by indication component 1444. For instance, referring to FIG. 10, the base station 1004 may transmit, to UE 1002, indication 1026 for the UE to switch CCs of a PUCCH group for PUCCH transmissions. For example, referring to FIG. 6, the base station may provide RRC-configured time pattern 610 to the UE semi-statically indicating the UE to switch to different ones of the CCs of PUCCH group 602 (e.g., PCC 604, SCC 606, or SCC 608) for different ones of the PUCCH transmissions 612 in response to SPS PDSCH transmission(s). In another example, referring to FIG. 6, the base station may provide a DCI dynamically indicating the UE to switch to one of the CCs of PUCCH group 602 (e.g., PCC 604, SCC 606, or SCC 608) for one of the PUCCH transmissions 612 in response to a dynamically scheduled PDSCH transmission In one example, the subset may be indicated in a configuration to the UE. For instance, referring to FIG. 8-10, the base station may provide an RRC configuration (e.g., the PUCCH configuration 1014 or some other RRC configuration) indicating subset of CCs 1012 (e.g., subset 808, 858) in PUCCH group 802, 852, 902 for PUCCH repetitions, such as described above with respect to FIGS. 8A and 8B. In such case, the UE may determine the subset of CCs 1012 (e.g., subset 808, 858) in which the UE may transmit PUCCH repetitions 912 from the RRC configuration provided by the base station 1004.

In one example, the subset may be configured based on at least one of a CC index or a CC duplexing scheme. For instance, referring to FIGS. 8-10, the base station 1004 may configure the subset of CCs 1012 (e.g., subset 808, 858) based on one or more configured rules, in response to which rule(s) the UE may identify the CCs 804, 806, 854, 856, 857, 904, 906, 908 for the subset 808, 858, 1012. For example, the base station may configure which CCs 804, 806, 854, 856, 857, 904, 906, 908 of PUCCH group 802, 852, 902 are included in subset 808, 858, 1012 according to an order of each CC index, and/or a duplexing scheme (e.g., FDD or TDD) associated with each CC. For instance, as described above with respect to FIGS. 8A/8B, in addition to selecting the PCC for a subset, the base station may select SCCs in ascending or descending order of CC index until N−1 SCCs are selected for the subset, and/or the base station may select SCCs associated with FDD configurations before SCCs associated with TDD configurations until N−1 SCCs are selected for the subset (since FDD bands typically include more PUCCH resources than TDD bands).

In one example, a maximum size of the subset may be fixed, indicated to the UE, or based on UE capability. For instance, referring to FIGS. 8-10, the subset of CCs 1012 (e.g., subset 808, 858) may have a maximum subset size N. This maximum subset size N may be a fixed (e.g., pre-configured) number, or the base station 1004 may indicate a value of N to the UE 1002 (e.g., in an RRC configuration such as PUCCH configuration 1014). The value of N may also be based on UE capability 1006. For example, if the UE indicates to the base station in UE capability 1006 that the UE is capable of carrier aggregating X CCs, where X is a given number of CCs indicated by the UE for carrier aggregation, the base station may select or indicate a value N for the maximum subset size such that N<X. Alternatively, N may be a function of X.

In one example, the indication may comprise a RRC-configured time pattern for switching between the CCs, and the time pattern of the CCs for the PUCCH repetitions may be the same as the RRC-configured time pattern. For instance, referring to FIGS. 6, 9, and 10, the base station 1004 may provide (as indication 1026) RRC-configured time pattern 610, 910 to the UE (e.g., in PUCCH configuration 1014 or some other RRC configuration), such as described above with respect to FIG. 6. Moreover, the PUCCH repetitions 912 may be configured to follow RRC-configured time pattern 610, 910 for PUCCH carrier switching, such as described above with respect to FIG. 9. In such case, the UE may determine the CCs 904, 906, 908 and corresponding slots in which to provide PUCCH repetitions based on the RRC-configured time pattern.

In one example, the indication may comprise a RRC-configured time pattern for switching between the CCs, and the time pattern of the CCs for the PUCCH repetitions may be different than the RRC-configured time pattern. For instance, referring to FIGS. 6, 9, and 10, the base station 1004 may provide (as indication 1026) the RRC-configured time pattern 610, 910 to the UE (e.g., in PUCCH configuration 1014 or some other RRC configuration), such as described above with respect to FIG. 6. Moreover, base station 1004 may further configure and indicate different time pattern 914 than RRC-configured time pattern 610, 910 for PUCCH repetitions 912 across CCs 904, 906, 908 of PUCCH group 902 (or across CCs in subset 808, 858). In such case, the UE 1002 may determine the order of CCs and corresponding slots for PUCCH repetitions indicated in the different time pattern 914, such as described above with respect to FIG. 9.

In one example, each of the resource allocations may be configured for an individual one of the CCs. For instance, referring to FIGS. 8-10, the base station 1004 may configure in the PUCCH configuration 1014 the resource allocations 1020 for PUCCH repetitions 1008 individually for each CC 804, 806, 854, 856, 857, 904, 906, 908 of PUCCH group 802, 852, 902 (or for each CC in subset 808, 858). In one example, the resource allocations may include different PUCCH starting symbols and different PUCCH transmission durations. For instance, referring to FIG. 10, each of the resource allocations 1020 may include different starting symbols 1022 and different PUCCH transmission durations 1024, such as described above with respect to FIG. 9.

In one example, one of the resource allocations may be configured for only one of the CCs and may be applied to other ones of the resource allocations for other ones of the CCs. For instance, referring to FIG. 10, the base station 1004 may configure in the PUCCH configuration 1014 the resource allocation 1020 for PUCCH repetitions 1008 in only one of the CCs 804, 806, 854, 856, 857, 904, 906, 908, and the base station and UE may apply that resource allocation 1020 to other ones of the CCs in PUCCH group 802, 852, 902 (or in subset 808, 858) for the PUCCH repetitions.

Figure 13:
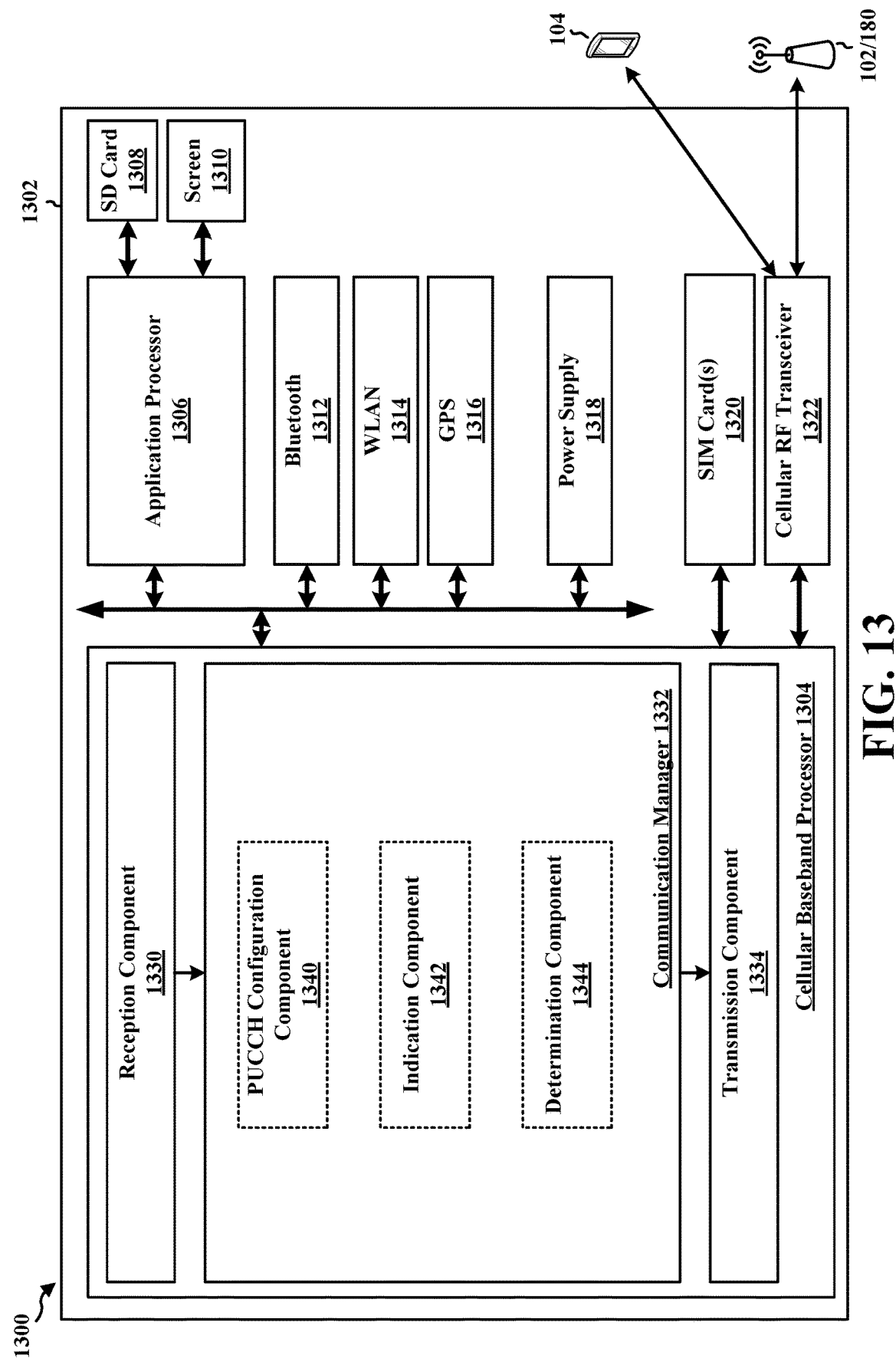
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a PUCCH configuration component 1340 that is configured to receive a PUCCH configuration from a base station indicating a plurality of PUCCH repetitions, e.g., as described in connection with 1102. The communication manager 1332 further includes an indication component 1342 that is configured to receive an indication from the base station to switch between CCs in a PUCCH group for PUCCH transmissions, e.g., as described in connection with 1104. The communication manager 1332 further includes a determination component 1344 that receives input in the form of the PUCCH repetitions from the PUCCH configuration component 1340 and the indication to switch between CCs in a PUCCH group for PUCCH transmissions from the indication component 1342, and is configured to determine at least one of: a subset of the CCs for the PUCCH repetitions, a time pattern of the CCs for the PUCCH repetitions, a resource allocation for each of the PUCCH repetitions, or a count for each of the PUCCH repetitions, e.g., as described in connection with 1106.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving a physical uplink control channel (PUCCH) configuration from a base station indicating a plurality of PUCCH repetitions, wherein the means for receiving is configured to receive an indication from the base station to switch between component carriers (CCs) in a PUCCH group for PUCCH transmissions; and means for determining at least one of: a subset of the CCs for the PUCCH repetitions, a time pattern of the CCs for the PUCCH repetitions, a resource allocation for each of the PUCCH repetitions, or a count for each of the PUCCH repetitions.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
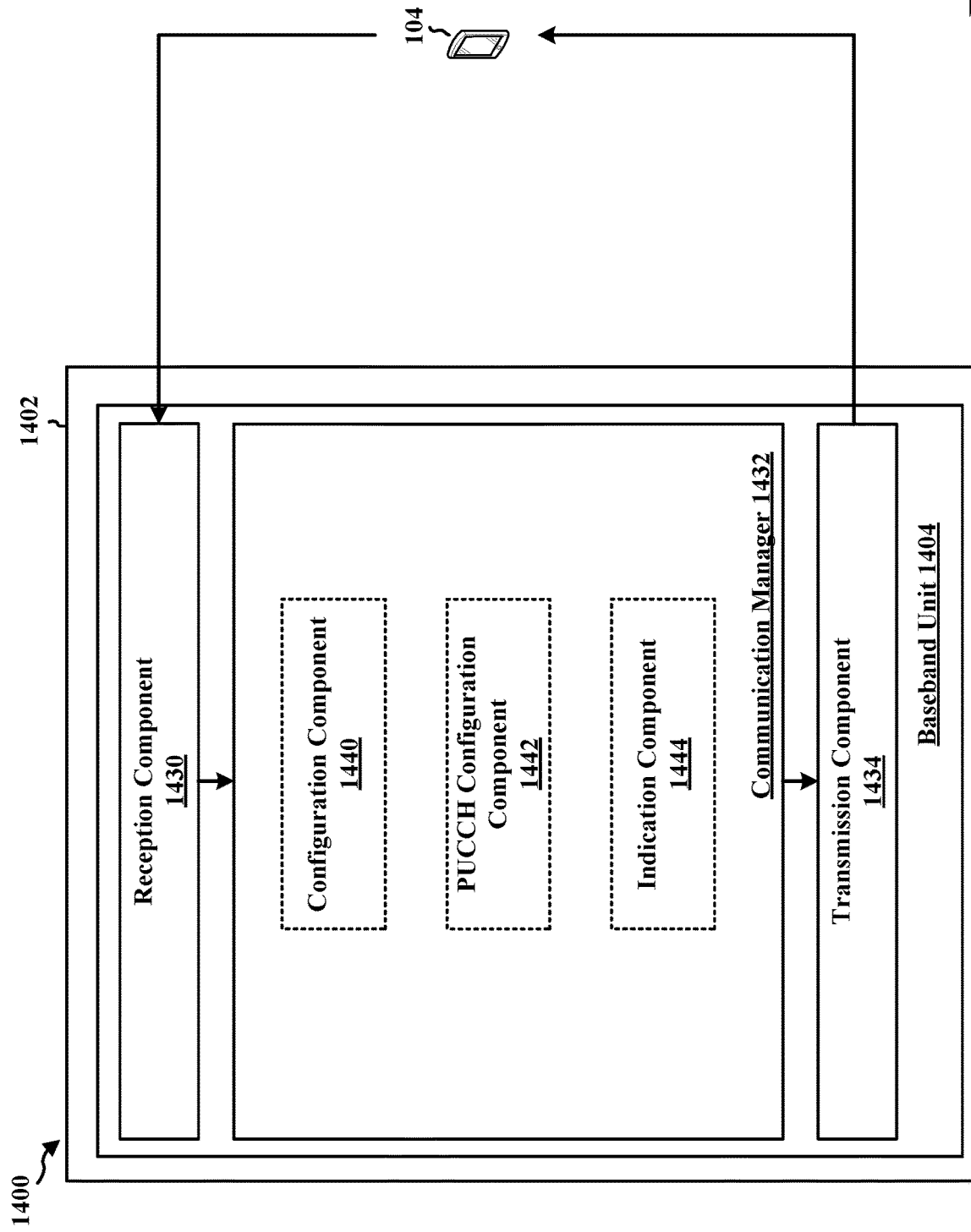
FIG. 14 is a diagram illustrating another example of a hardware implementation for another example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a configuration component 1440 that is configured to configure at least one of: a subset of CCs for PUCCH repetitions, a time pattern of the CCs for the PUCCH repetitions, or a resource allocation for each of the PUCCH repetitions, e.g., as described in connection with 1202. The communication manager 1432 further includes a PUCCH configuration component 1442 that is configured to transmit a PUCCH configuration to a UE indicating a plurality of PUCCH repetitions, e.g., as described in connection with 1204. The communication manager 1432 further includes an indication component 1444 that is configured to transmit an indication to the UE to switch between CCs in a PUCCH group for PUCCH transmissions, e.g., as described in connection with 1206.

The apparatus may include additional components that perform each of the blocks of the algorithm in the aforementioned flowcharts of FIGS. 10 and 12. As such, each block in the aforementioned flowcharts of FIGS. 10 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for transmitting a physical uplink control channel (PUCCH) configuration to a user equipment (UE) indicating a plurality of PUCCH repetitions, wherein the means for transmitting is configured to transmit an indication to the UE to switch between component carriers (CCs) in a PUCCH group for PUCCH transmissions; and means for configuring at least one of: a subset of the CCs for the PUCCH repetitions, a time pattern of the CCs for the PUCCH repetitions, or a resource allocation for each of the PUCCH repetitions.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure allow a UE configured with PUCCH repetitions to determine, in response to an indication from the base station to switch carriers for PUCCH transmissions, which CCs of a PUCCH group are configured for PUCCH repetitions, when CCs are configured for PUCCH repetitions, what resources in CCs are configured for PUCCH repetitions, and/or how to count PUCCH repetitions in configured CCs. For instance, the UE may receive a PUCCH configuration from a base station indicating a plurality of PUCCH repetitions, receive an indication from the base station to switch between CCs in a PUCCH group for PUCCH transmissions, and determine in response to the indication at least one of: a subset of the CCs for the PUCCH repetitions, a time pattern of the CCs for the PUCCH repetitions, a resource allocation for each of the PUCCH repetitions, or a count for each of the PUCCH repetitions. In this way, the UE may transmit PUCCH repetitions across multiple CCs of a PUCCH group, including PCCs (or PSCCs) and SCC(s), with minimal latency (e.g., without limiting repetitions to PCCs or PSCCs).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving a physical uplink control channel (PUCCH) configuration from a base station indicating a plurality of PUCCH repetitions; receiving an indication from the base station to switch between component carriers (CCs) in a PUCCH group for PUCCH transmissions; and determining at least one of: a subset of the CCs for the PUCCH repetitions, a time pattern of the CCs for the PUCCH repetitions, a resource allocation for each of the PUCCH repetitions, or a count for each of the PUCCH repetitions.

Example 2 is the method of Example 1, wherein the subset is indicated in a configuration from the base station.

Example 3 is the method of Example 1, wherein the subset is determined based on at least one of a CC index or a CC duplexing scheme.

Example 4 is the method of any of Examples 1-3, wherein a maximum size of the subset is fixed, indicated from the base station, or based on UE capability.

Example 5 is the method of any of Examples 1-4, wherein the indication comprises a radio resource control (RRC)-configured time pattern for switching between the CCs, and the time pattern of the CCs for the PUCCH repetitions is the same as the RRC-configured time pattern.

Example 6 is the method of any of Examples 1-4, wherein the indication comprises a radio resource control (RRC)-configured time pattern for switching between the CCs, and the time pattern of the CCs for the PUCCH repetitions is different than the RRC-configured time pattern.

Example 7 is the method of any of Examples 1-6, wherein each of the resource allocations is configured for an individual one of the CCs.

Example 8 is the method of Example 7, wherein the resource allocations include different PUCCH starting symbols and different PUCCH transmission durations.

Example 9 is the method of any of Examples 1-6, wherein one of the resource allocations is configured for only one of the CCs and is applied to other ones of the resource allocations for other ones of the CCs.

Example 10 is the method of any of Examples 1-9, wherein the count for each of the PUCCH repetitions is based on a corresponding one of the resource allocations for a corresponding one of the CCs.

Example 11 is an apparatus for wireless communication, comprising: a processor; memory coupled with the processor; and instructions stored in the memory and operable, when executed by the processor, to cause the apparatus to: receive a physical uplink control channel (PUCCH) configuration from a base station indicating a plurality of PUCCH repetitions; receive an indication from the base station to switch between component carriers (CCs) in a PUCCH group for PUCCH transmissions; and determine at least one of: a subset of the CCs for the PUCCH repetitions, a time pattern of the CCs for the PUCCH repetitions, a resource allocation for each of the PUCCH repetitions, or a count for each of the PUCCH repetitions.

Example 12 is the apparatus of Example 11, wherein the subset is indicated in a configuration from the base station.

Example 13 is the apparatus of Example 11, wherein the subset is determined based on at least one of a CC index or a CC duplexing scheme.

Example 14 is the apparatus of any of Examples 11-13, wherein the indication comprises a radio resource control (RRC)-configured time pattern for switching between the CCs, and the time pattern of the CCs for the PUCCH repetitions is the same as the RRC-configured time pattern.

Example 15 is the apparatus of any of Examples 11-13, wherein the indication comprises a radio resource control (RRC)-configured time pattern for switching between the CCs, and the time pattern of the CCs for the PUCCH repetitions is different than the RRC-configured time pattern.

Example 16 is the apparatus of any of Examples 11-15, wherein each of the resource allocations is configured for an individual one of the CCs.

Example 17 is the apparatus of any of Examples 11-15, wherein one of the resource allocations is configured for only one of the CCs and is applied to other ones of the resource allocations for other ones of the CCs.

Example 18 is the apparatus of any of Examples 11-17, wherein the count for each of the PUCCH repetitions is based on a corresponding one of the resource allocations for a corresponding one of the CCs.

Example 19 is a method of wireless communication at a base station, comprising: transmitting a physical uplink control channel (PUCCH) configuration to a user equipment (UE) indicating a plurality of PUCCH repetitions; transmitting an indication to the UE to switch between component carriers (CCs) in a PUCCH group for PUCCH transmissions; and configuring at least one of: a subset of the CCs for the PUCCH repetitions, a time pattern of the CCs for the PUCCH repetitions, or a resource allocation for each of the PUCCH repetitions.

Example 20 is the method of Example 19, wherein the subset is indicated in a configuration to the UE.

Example 21 is the method of Example 19, wherein the subset is configured based on at least one of a CC index or a CC duplexing scheme.

Example 22 is the method of any of Examples 19-21, wherein a maximum size of the subset is fixed, indicated to the UE, or based on UE capability.

Example 23 is the method of any of Examples 19-22, wherein the indication comprises a radio resource control (RRC)-configured time pattern for switching between the CCs, and the time pattern of the CCs for the PUCCH repetitions is the same as the RRC-configured time pattern.

Example 24 is the method of any of Examples 19-22, wherein the indication comprises a radio resource control (RRC)-configured time pattern for switching between the CCs, and the time pattern of the CCs for the PUCCH repetitions is different than the RRC-configured time pattern.

Example 25 is the method of any of Examples 19-24, wherein each of the resource allocations is configured for an individual one of the CCs.

Example 26 is the method of any of Examples 19-24, wherein one of the resource allocations is configured for only one of the CCs and is applied to other ones of the resource allocations for other ones of the CCs.

Example 27 is an apparatus for wireless communication, comprising: a processor; memory coupled with the processor; and instructions stored in the memory and operable, when executed by the processor, to cause the apparatus to: transmit a physical uplink control channel (PUCCH) configuration to a user equipment (UE) indicating a plurality of PUCCH repetitions; transmit an indication to the UE to switch between component carriers (CCs) in a PUCCH group for PUCCH transmissions; and configure at least one of: a subset of the CCs for the PUCCH repetitions, a time pattern of the CCs for the PUCCH repetitions, or a resource allocation for each of the PUCCH repetitions.

Example 28 is the apparatus of Example 27, wherein the subset is indicated in a configuration to the UE or wherein the subset is configured based on at least one of a CC index or a CC duplexing scheme.

Example 29 is the apparatus of Example 27 or 28, wherein the indication comprises a radio resource control (RRC)-configured time pattern for switching between the CCs, and the time pattern of the CCs for the PUCCH repetitions is the same as the RRC-configured time pattern or different than the RRC-configured time pattern.

Example 30 is the apparatus of any of Examples 27-29, wherein each of the resource allocations is configured for an individual one of the CCs, or wherein one of the resource allocations is configured for only one of the CCs and is applied to other ones of the resource allocations for other ones of the CCs.

What is claimed is:

1. A method of wireless communication at a user equipment (UE), comprising:
    receiving a configuration from a base station indicating only a subset of component carriers (CC) in a physical uplink control channel (PUCCH) group for PUCCH transmissions, the subset having a lesser quantity of CCs than a number of CCs in the PUCCH group;
    receiving an indication from the base station to switch between the CCs in the PUCCH group; and
    transmitting the PUCCH transmissions in the subset of the CCs in response to the indication.

2. The method of claim 1, further comprising:
    determining the subset of the CCs for the PUCCH transmissions.

3. The method of claim 2, wherein the subset is determined based on at least one of a CC index or a CC duplexing scheme.

4. The method of claim 1, wherein a maximum size of the subset is fixed, indicated from the base station, or based on UE capability.

5. The method of claim 1, further comprising:
    determining a time pattern of the CCs for the PUCCH transmissions, wherein the indication comprises a radio resource control (RRC)-configured time pattern for switching between the CCs, and the time pattern of the CCs for the PUCCH transmissions is the same as the RRC-configured time pattern.

6. The method of claim 1, further comprising:
    determining a time pattern of the CCs for the PUCCH transmissions, wherein the indication comprises a radio resource control (RRC)-configured time pattern for switching between the CCs, and the time pattern of the CCs for the PUCCH transmissions is different than the RRC-configured time pattern.

7. The method of claim 1, further comprising:
    determining a resource allocation for each of the PUCCH transmissions, wherein each of the resource allocations is configured for an individual one of the CCs.

8. The method of claim 7, wherein the resource allocations include different PUCCH starting symbols and different PUCCH transmission durations.

9. The method of claim 1, further comprising:
    determining a resource allocation for each of the PUCCH transmissions, wherein one of the resource allocations is configured for only one of the CCs and is applied to other ones of the resource allocations for other ones of the CCs.

10. The method of claim 1, further comprising:
    determining a resource allocation and a count for each of the PUCCH transmissions, wherein the count for each of the PUCCH transmissions is based on a corresponding one of the resource allocations for a corresponding one of the CCs.

11. An apparatus for wireless communication, comprising:
    one or more processors;
    one or more memories each coupled with at least one of the one or more processors; and
    instructions stored in the one or more memories, individually or in combination, and operable, when executed by the one or more processors, individually or in combination, to cause the apparatus to:

receive a configuration from a base station indicating only a subset of component carriers (CC) in a physical uplink control channel (PUCCH) group for PUCCH transmissions, the subset having a lesser quantity of CCs than a number of CCs in the PUCCH group;

receive an indication from the base station to switch between the CCs in the PUCCH group; and transmit the PUCCH transmissions in the subset of the CCs in response to the indication.

12. The apparatus of claim 11, wherein the instructions when executed by the one or more processors, individually or in combination, further cause the apparatus to:

determine the subset of the CCs for the PUCCH transmissions.

13. The apparatus of claim 12, wherein the subset is determined based on at least one of a CC index or a CC duplexing scheme.

14. The apparatus of claim 11, wherein the instructions when executed by the one or more processors, individually or in combination, further cause the apparatus to:

determine a time pattern of the CCs for the PUCCH transmissions, wherein the indication comprises a radio resource control (RRC)-configured time pattern for switching between the CCs, and the time pattern of the CCs for the PUCCH transmissions is the same as the RRC-configured time pattern.

15. The apparatus of claim 11, wherein the instructions when executed by the one or more processors, individually or in combination, further cause the apparatus to:

determine a time pattern of the CCs for the PUCCH transmissions, wherein the indication comprises a radio resource control (RRC)-configured time pattern for switching between the CCs, and the time pattern of the CCs for the PUCCH transmissions is different than the RRC-configured time pattern.

16. The apparatus of claim 11, wherein the instructions when executed by the one or more processors, individually or in combination, further cause the apparatus to:

determine a resource allocation for each of the PUCCH transmissions, wherein each of the resource allocations is configured for an individual one of the CCs.

17. The apparatus of claim 11, wherein the instructions when executed by the one or more processors, individually or in combination, further cause the apparatus to:

determine a resource allocation for each of the PUCCH transmissions, wherein one of the resource allocations is configured for only one of the CCs and is applied to other ones of the resource allocations for other ones of the CCs.

18. The apparatus of claim 11, wherein the instructions when executed by the one or more processors, individually or in combination, further cause the apparatus to:

determine a resource allocation and a count for each of the PUCCH transmissions, wherein the count for each of the PUCCH transmissions is based on a corresponding one of the resource allocations for a corresponding one of the CCs.

19. A method of wireless communication at a base station, comprising:

transmitting a configuration to a user equipment (UE) indicating only a subset of component carriers (CC) in a physical uplink control channel (PUCCH) group for PUCCH transmissions, the subset having a lesser quantity of CCs than a number of CCs in the PUCCH group;

transmitting an indication to the UE to switch between the CCs in the PUCCH group; and receiving the PUCCH transmissions in the subset of the CCs in response to the indication.

20. The method of claim 19, further comprising:

configuring the subset of the CCs for the PUCCH transmissions.

21. The method of claim 20, wherein the subset is configured based on at least one of a CC index or a CC duplexing scheme.

22. The method of claim 19, wherein a maximum size of the subset is fixed, indicated to the UE, or based on UE capability.

23. The method of claim 19, further comprising:

configuring a time pattern of the CCs for the PUCCH transmissions, wherein the indication comprises a radio resource control (RRC)-configured time pattern for switching between the CCs, and the time pattern of the CCs for the PUCCH transmissions is the same as the RRC-configured time pattern.

24. The method of claim 19, further comprising:

configuring a time pattern of the CCs for the PUCCH transmissions, wherein the indication comprises a radio resource control (RRC)-configured time pattern for switching between the CCs, and the time pattern of the CCs for the PUCCH transmissions is different than the RRC-configured time pattern.

25. The method of claim 19, further comprising:

configuring a resource allocation for each of the PUCCH transmissions, wherein each of the resource allocations is configured for an individual one of the CCs.

26. The method of claim 19, further comprising:

configuring a resource allocation for each of the PUCCH transmissions, wherein one of the resource allocations is configured for only one of the CCs and is applied to other ones of the resource allocations for other ones of the CCs.

27. An apparatus for wireless communication, comprising:

one or more processors;

one or more memories each coupled with at least one of the one or more processors; and instructions stored in the one or more memories, individually or in combination, and operable, when executed by the one or more processors, individually or in combination, to cause the apparatus to:

transmit a configuration to a user equipment (UE) indicating only a subset of component carriers (CC) in a physical uplink control channel (PUCCH) group for PUCCH transmissions, the subset having a lesser quantity of CCs than a number of CCs in the PUCCH group;

transmit an indication to the UE to switch between the CCs in the PUCCH group; and receive the PUCCH transmissions in the subset of the CCs in response to the indication.

28. The apparatus of claim 27, wherein the instructions when executed by the one or more processors, individually or in combination, further cause the apparatus to:

configure the subset of the CCs for the PUCCH transmissions, wherein the subset is configured based on at least one of a CC index or a CC duplexing scheme.

29. The apparatus of claim 27, wherein the instructions when executed by the one or more processors, individually or in combination, further cause the apparatus to:

configure a time pattern of the CCs for the PUCCH transmissions, wherein the indication comprises a radio resource control (RRC)-configured time pattern for switching between the CCs, and the time pattern of the CCs for the PUCCH transmissions is the same as the RRC-configured time pattern or different than the RRC-configured time pattern.

30. The apparatus of claim 27, wherein the instructions when executed by the one or more processors, individually or in combination, further cause the apparatus to:
configure a resource allocation for each of the PUCCH transmissions, wherein each of the resource allocations is configured for an individual one of the CCs, or wherein one of the resource allocations is configured for only one of the CCs and is applied to other ones of the resource allocations for other ones of the CCs.

* * * * *